(12) United States Patent
Takeyama et al.

(10) Patent No.: US 6,704,128 B2
(45) Date of Patent: Mar. 9, 2004

(54) OPTICAL SYSTEM AND DEVICE USING THE SAME

(75) Inventors: Tetsuhide Takeyama, Hachioji (JP); Yasuyuki Ohyagi, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/201,318

(22) Filed: Jul. 24, 2002

(65) Prior Publication Data

US 2003/0090753 A1 May 15, 2003

(30) Foreign Application Priority Data

Jul. 24, 2001 (JP) ........................................ 2001-222961

(51) Int. Cl.[7] ................................................. G02B 5/32
(52) U.S. Cl. ........................... 359/15; 359/13; 359/831; 359/833; 359/630
(58) Field of Search ............................... 359/13–16, 19, 359/831, 833, 834, 837, 630, 631, 633

(56) References Cited

U.S. PATENT DOCUMENTS 6,429,954 B1 * 8/2002 Kasai ........................... 359/13

* cited by examiner

*Primary Examiner*—Drew Dunn
*Assistant Examiner*—Fayez Assaf
(74) *Attorney, Agent, or Firm*—Kenyon & Kenyon

(57) ABSTRACT

A viewing optical system for display devices or an image pickup optical system, which can be used with high efficiency at a plurality of wavelengths and enables bright images to be viewed with satisfactory color reproducibility and well-corrected aberrations. The optical system comprises a first prism, a second prism and a volume hologram element disposed between them and cemented to them. The hologram element comprises a first volume hologram optimized in such a way as to effect diffraction at least at a first wavelength and a second hologram optimized in such a way as to effect diffraction at a second wavelength different from the first wavelength. The first and second holograms are identical with each other in terms of the shape and spacing of interference fringes on their surfaces but different from each other in terms of the spacing and tilt of interference fringes in their hologram media.

19 Claims, 23 Drawing Sheets

Note: i ≑ r : Angle of reflection and diffraction (°)
s : Angle of transmission (°)

OPTICAL SYSTEM AND DEVICE USING THE SAME

This application claims benefit of Japanese Patent application No. 2001-222961 filed in Japan Jul. 24, 2001, the contents of which are incorporated by this reference.

BACKGROUND OF THE INVENTION

The present invention relates generally to an optical system and devices using the same, and more particularly to an optical system such as a viewing or image pickup optical system that is used with an image display device or the like which may be mounted over the head or face of an observer or added to cellar phones or easy-to-carry information terminals.

For the purposes of allowing individuals to enjoy large-screen images, image display devices, especially head or face-mounted type image display devices are now under increasing development. There is also a growing demand for providing large-screen viewing of image-wise or character-wise data on cellar phones or portable information terminals.

For instance, U.S. Pat. No. 2,993,319 proposes a vehicle-mounted display device using a reflection hologram element having functions similar to those of a beam splitter capable of reflecting and diffracting only light having a specific range of angles of incidence and transmitting light having other angles of incidence. As proposed and shown in this patent publication, the angle selectivity of the reflection hologram element is used to achieve the beam splitter function of guiding light from a light source to an observer.

A viewing optical system comprising a combination of a reflection hologram element formed on a spherical substrate in the air with a reflection hologram element formed on a planar substrate in the air is proposed in U.S. Pat. No. 4,874,214. In this case, the reflection hologram formed on the planar substrate makes use of angle selectivity, thereby achieving the beam splitter function.

The aforesaid U.S. Pat. No. 2,993,319 refers only to means for achieving a hologram beam splitter using the angle selectivity of a monochromatic (a single band: wavelength band) corresponding to the green wavelength region. For instance, this patent publication does not pay any attention to the case where, for instance, a beam splitter harnessing the angle selectivity of a reflection hologram element is designed for light in several (e.g., red (R), green (G) and blue (B) or three-band light) bands.

That patent publication does not also say anything specific about the profile, etc. of optical powers for achieving the beam splitter function making use of the angle selectivity of a reflection hologram element.

The viewing optical system proposed in U.S. Pat. No. 4,874,214 comprises a hologram element having a spherical shape. It is here noted that a hologram element has two powers, i.e., optical power due to a geometrical shape and optical power due to its diffraction effect. For instance, two powers of a hologram element formed on a substrate member of spherical shape are now explained with reference to FIGS. 27(a) and 27(b). The hologram element has power due to a difference in density between interference fringes as represented by the pitch of a periodical structure within the hologram element as shown in FIG. 27(a), and optical power due to its geometrical shape as shown in FIG. 27(b). Here assume R is the radius of curvature of the hologram substrate. Then, the optical power $\Phi$ of a conventional optical refracting lens, and a conventional reflector may be calculated from the following equations:

$\Phi=(n-1)(1/R)$ for a refracting system $\Phi=2/R$ for a front surface mirror $\Phi=2n/R$ for a back-surface mirror Here $\Phi$ is the optical power due to the geometrical shape, n is the refractive index of a medium, and R is the radius of curvature of the hologram substrate.

It is thus understood that to obtain a certain quantity of optical power by the geometrical shape, the radius of curvature, R, of the back-surface mirror should be gentler than that of the front surface mirror by 1/n.

To put it another way, if the interior of the reflection hologram element is filled up with a medium with a refractive index n, for instance, a glass or plastic medium as is the case with a back-surface mirror, it is then possible to obtain large optical power due to geometrical shape, even when the geometrical shape has a gentle radius of curvature, R.

Thus, if an arrangement ensuring to generate large optical power at such a gentle radius of curvature R is used for an optical system, it is then possible to reduce aberrations produced at this hologram surface.

In the viewing optical system of U.S. Pat. No. 4,874,214 wherein the spacing between the planar surface and the spherical surface is not filled up with a glass or plastic medium, however, the geometrical shape must be constructed with a smaller radius of curvature R so as to obtain the required quantity of optical power by the geometrical configuration having a spherical shape.

When the geometrical shape is constructed with a smaller radius of curvature R, however, it is difficult to display satisfactory images because of increases in the aberrations produced at this reflecting surface. For lack of any optical surface in an optical path between the image plane and the aforesaid curved surface, it is difficult to make satisfactory correction for distortion.

SUMMARY OF THE INVENTION

Having been accomplished with a view of solving such problems with the prior art as described above, the primary object of the present invention is to provide a viewing or image pickup optical system used with image display devices, which system can be used with high efficiency at a plurality of wavelengths, enables bright images to be observed with high color reproducibility, is easy to assemble, resist to impacts such as vibrations, light in weight and compact in size, and makes it possible to observe images well corrected for aberrations, and devices using the same.

According to the first aspect of the present invention, the aforesaid object is achieved by the provision of an optical system that is disposed between an image plane and an optical pupil and having generally positive power, wherein:

said optical system comprises a first prism having a refractive index of greater than 1, a second prism having a refracting index of greater than 1, and a volume hologram element disposed between said first prism and said second prism and cemented thereto, wherein:

said volume hologram element comprises a first volume hologram optimized in such a way as to effect Bragg diffraction at least at a first wavelength and a second volume hologram optimized in such a way as to effect Bragg diffraction at a second wavelength different from said first wavelength, and said volume hologram element is designed in such a way that diffraction efficiency thereof reaches a maximum at a first angle of incidence and a first angle of reflection and diffraction which vary with the position of said volume hologram element at least at said first wavelength and at a second angle of incidence and a second angle of reflection and diffraction which vary with the position of said volume hologram element at least at said second wavelength (it is here noted that the volume hologram element includes an element obtained by multi-exposing a single-layer volume hologram film to light including a plurality of wavelengths or a multilayer hologram element, and that the first and second wavelengths refer to two wavelengths in the RGB wavelength region or, for instance, two wavelengths R1 and R2 chosen out of the R wavelength region of the RGB wavelength region), said first prism is located on said optical pupil side and said second prism is located on said image plane side, said second prism has at least one reflecting surface formed at a surface thereof different from a surface thereof having said volume hologram element, a light beam, which propagates from said optical pupil to said image plane in a forward or backward direction and includes at least a ray component of said first wavelength and at least a ray component of said second wavelength, passes through said volume hologram element in order from said first prism side to said second prism side, whereupon said light beam is reflected at said reflecting surface in said second prism and reflected and diffracted by said volume hologram element in said second prism, and said first volume hologram and said second volume hologram are identical with each other in terms of interference fringe shape and spacing on the surfaces thereof but are difference from each other in terms of interference fringe spacing and tilt in hologram media.

Why the aforesaid arrangement is used in the present invention, and how it works is now explained.

The optical system of the present invention is disposed between the image plane and the optical pupil, and has generally positive power. For backward ray tracing, a light beam passing from the optical pupil to the image plane is selected, and for forward ray tracing, a light beam passing from the image plane to the optical pupil is selected. When a light beam is passed in the forward ray tracing direction while an image display element is located at the image plane and the pupil of the eye of an observer is placed in the vicinity of the position of the optical pupil, the optical system may be used as a viewing or eyepiece optical system. When a light beam from a subject positioned in front of the optical pupil is passed in the backward ray tracing direction while an image pickup element such as a silver salt film or CCD is located at the image plane, the optical system may be used as an image pickup optical system.

Disposed between the image plane and the optical pupil and having generally positive power, the optical system of the present invention comprises a first prism having a refractive index of greater than 1, a second prism having a refractive index of greater than 1 and a volume hologram element disposed between the first prism and the second prism and cemented thereto. The first prism is positioned on the optical pupil side. The second prism is positioned on the image plane side, and has at least one reflecting surface formed at a surface thereof different from the surface thereof having the volume hologram element.

The volume hologram element may be a multi-recorded or multi-layered hologram element. The volume hologram element comprises a first volume hologram optimized in such a way as to effect Bragg diffraction at least at a first wavelength and a second volume hologram optimized in such a way as to effect Bragg diffraction at a second wavelength different from the first wavelength, and should be designed in such a way that the diffraction efficiency reaches a maximum at a first angle of incidence and a first angle of reflection and diffraction that vary with the position of the volume hologram element at at least the first wavelength and at a second angle of incidence and a second angle of reflection and diffraction that vary with the position of the volume hologram element at at least the second wavelength.

Such a volume hologram element, for instance, may include an element formed by multi-exposure of a single-layer volume hologram film to a plurality of wavelengths (multi-recording) or a multilayer hologram element formed by recording holograms of different wavelengths on a plurality of layers, one wavelength for one layer. The first and second wavelengths are understood to refer to two wavelengths chosen from the RGB wavelength bands or two wavelengths R1 and R2 chosen from, for instance, the R region in the RGB wavelength band.

The optical system of the present invention is designed in such a way that a light beam, which propagates from the optical pupil to the image plane in a forward or backward direction and includes at least a ray component of the first wavelength and at least a ray component of the second wavelength, passes through the volume hologram element in order from the first prism side to the second prism side, whereupon the light beam is reflected at the reflecting surface in the second prism and reflected and diffracted by the volume hologram element in the second prism.

Thus, the interior of the optical system is filled up with the glass, plastic or other materials for the first prism, second prism and volume hologram element, whereby the optical power due to the surface shape of each optically active surfaces can be increased with satisfactory correction for aberrations such as spherical aberrations and coma.

In the optical system of the present invention, the volume hologram element is interposed between the first prism and the second prism, and cemented to both prisms.

If a volume hologram element is used as a beam splitter positioned at the boundary between the first prism and the second prism for branching an optical path, diffraction efficiency approximate to 100% can then be obtained upon reflection and diffraction with no substantial transmission loss, so that bright image display and image pickup can be achieved with no light quantity losses. If two prisms, i.e., the first prism on the optical pupil side and the second prism on the image plane side are integrated with a volume hologram element sandwiched between them into a one-piece member, it is then possible to eliminate any optical axis misalignment due to the presence of an air spacing upon assembling or troublesome setting operation. It is thus possible to achieve a viewing or image pickup system that is easy to assemble and resistant to impacts such as vibrations.

If the volume hologram element is cemented to the first and second prisms while it is sandwiched between them, it is then possible to make the volume hologram element dust-proof. It is thus possible to prevent enlarged observation of dust, etc. and transfer of them onto the image plane without recourse to any separate dust-proof member, and penetration of moisture from outside into the volume hologram element, which may otherwise cause the volume hologram to expand, resulting in a change of the peak wavelength of diffraction efficiency.

In the optical system of the present invention, the first volume hologram and the second volume hologram should be identical with each other in terms of their surface interference shape and spacing but should be different from each other in terms of the interference fringe spacing and tilt in their hologram media.

Why that arrangement is critical for the present invention is now explained.

For a better understanding, here consider a volume hologram element 6 which is made up of three volume hologram layers $6_R$, $6_G$ and $6_B$ stacked one upon another, as shown in FIG. 8(a). Then assume that the volume hologram $6_R$ is optimized in such a way as to effect Bragg diffraction at a specific wavelength in the R wavelength region, the volume hologram $6_G$ is optimized in such a way as to effect Bragg diffraction at a specific wavelength in the G wavelength region, and the volume hologram $6_B$ is optimized in such a way as to effect Bragg diffraction at a specific wavelength in the B wavelength region.

A volume hologram has the property of having the maximum diffraction efficiency at an optimized wavelength in such a way that Bragg diffraction takes place. Even at other wavelengths, however, that volume hologram generally has a diffraction efficiency depending on a shift from the optimized wavelength. Accordingly, when light having a specific wavelength in the B wavelength region, upon incidence on a specific position A in the volume hologram element 6 at an angle of incidence $i_B$ optimized at that position A, is diffracted by the volume hologram $6_B$ in the volume hologram 6 at an angle of diffraction $r_B$ with the maximum efficiency to produce diffracted light $21_B$, the incident light $20_B$ is slightly, if not largely, diffracted by other volume holograms $6_R$ and $6_G$ to produce diffracted light $21_{BR}$ and $21_{BG}$, as shown in FIG. 8(a). Then, the angles of diffraction $r_{BR}$ and $r_{BG}$ of diffracted light $21_{BR}$ and $21_{BG}$ having specific wavelengths in the B wavelength region are generally different from the angle of diffraction $r_B$ due to the volume hologram $6_B$. Thus, when the same wavelength (i.e., the specific wavelength in the B wavelength region) is diffracted by the volume hologram 6 in a plurality of different directions, the image-formation capability of an optical system, which uses such a volume hologram element 6 as a beam splitter and to which the present invention is applied, becomes worse (leading to not only chromatic aberrations but also monochromatic aberration).

To prevent any diffraction of light of one such wavelength in plural directions according to the present invention, the surfaces of the volume holograms $6_R$, $6_G$ and $6_B$ forming the volume hologram element 6 should be constructed of interference fringes having the same shape and spacing, so that the angles of diffraction $r_{BR}$ and $r_{BG}$ in FIG. 8(a) become the same as the angle of diffraction $r_B$ and, hence, each of the diffracted light $21_{BR}$ and $21_{BG}$ is in coincidence with the diffracted light $21_B$, as shown in FIG. 8(b). Consequently, incident light having any desired wavelength is diffracted with a specific angle of diffraction at any desired position in the volume hologram element 6; diffraction of light having any desired wavelength in plural directions is prevented.

It is here understood that the angle of diffraction of light diffracted by a volume hologram is determined by the shape and spacing of interference fringes on its surface or if the volume holograms $6_R$, $6_G$ and $6_B$ forming the volume hologram 6 are identical with one another in terms of their surface interference fringe shape and spacing, the three volume holograms $6_R$, $6_G$ and $6_B$ have the same angle of diffraction, as explained just below.

Consider a volume hologram sandwiched between isotropically uniform media, as shown in FIG. 9. A region I is defined by the isotropically uniform medium on the entrance side, a region II is defined by the volume hologram and a region II is defined by the isotropically uniform medium on the transmission side, with x- and z-axes determined as shown.

A diffraction grating recorded in a phase type volume hologram may be given by $$\epsilon = \epsilon_{II} + \Delta\epsilon \cdot \cos(K \cdot r) \tag{11}$$

where eII is the average dielectric constant of the hologram, Δe is the amplitude of dielectric constant modulation of the hologram, r is a position vector, and K is a grating vector that may be represented by $$K = 2\pi/\Lambda(\sin\phi, 0, \cos\phi) \tag{12}$$

Here Λ is a grating spacing (interference fringe spacing), and φ is the angle of K with the z-axis. It is noted that (sin φ, 0, cos φ) represents that the x component is sin φ, the y component is 0, and the z component is a vector of cos φ, as hereinafter applies.

With respect to S-polarized light, a wave equation in the hologram is given by $$\nabla^2 E + k^2 \epsilon E = 0 \tag{13}$$

Here E is an electric field, and k is the magnitude of a wave vector in vacuum, given by $$k = 2\pi/\lambda$$

For reason of the periodicity of the grating (interference fringes), Floquet's theorem may hold; the electric field E in the hologram may be given by $$E = \Sigma S_i(z) \exp(-j\sigma_i \cdot r) \tag{15}$$

i $$\sigma_i = \rho - iK \tag{16}$$

where j is an imaginary unit, and ρ is the wave vector of reference light (zero-order diffracted light), i is an integer tantamount to the order of diffraction in the case of a hologram, $S_i(z)$ is the amplitude of an i-th order diffracted light, and $\sigma_i$ is the wave vector of an i-th order diffracted light.

Alternatively, ρ may be represented by $$\rho = 2\pi/\lambda \times \sqrt{\epsilon_{II}}(\sin\theta, 0, \cos\theta) \tag{17}$$

Here θ is the angle of incidence of reference light (zero-order light) in the hologram.

Regarding the i-th diffracted light emerging from the hologram, the hologram surface tangential component of the wave vector must be preserved according to phase matching conditions, as given by the following equation:

$$k_{Ii} \cdot x_0 = \sigma_i \cdot x_0 = k_{IIIi} \cdot x_0 \tag{18}$$

Here $k_{Ii}$ and $k_{IIIi}$ are the wave vectors of the i-th order diffracted light upon reflection and transmission outside of the hologram, respectively, and $x_0$ is a unit vector in the x-axis direction.

From equations (12), (16) and (17), the second term of equation (18) is $$\sigma_i \cdot x_0 = 2\pi/\lambda \times \sqrt{\epsilon_{II}} \times \sin\theta - i2\pi/\Lambda \times \sin\phi \tag{19}$$

Since the grating (interference fringes) spacing Λs is $$\Lambda s = \Lambda/\sin\phi \tag{20}$$

equation (19) may be rewritten as $$\sigma_i \cdot x_0 = 2\pi/\lambda \times \sqrt{\epsilon_{II}} \times \sin\theta - i2\pi/\Lambda s \quad (21)$$

In region I formed of the isotropically uniform medium, the magnitude of the wave vector of diffracted light is represented by $$|k_{Ii}| = 2\pi/\lambda \times \sqrt{\epsilon_I} \quad (22)$$

Here $\epsilon_I$ is the dielectric constant of region I.

Therefore, the z-component of the wave vector of diffracted light in region I is $$k_{Ii} \cdot z_0 = \{|k_{Ii}|^2 - (\sigma_i \cdot x_0)^2\}^{1/2} \quad (23)$$

$$= -|k_{Ii}|\{1 - 1/\epsilon_I \times (\sqrt{\epsilon_{II}} \times \sin\theta - i\lambda/\Lambda s)^2\}^{1/2}$$

so that the wave vector in region I is given by $$k_{Ii} = 2\pi/\lambda \times \sqrt{\epsilon_I} \times \left(1/\sqrt{\epsilon_I} \times (\sqrt{\epsilon_{II}} \times \sin\theta - i\lambda/\Lambda s), \right. \quad (24)$$

$$\left. 0, -\{1 - 1/\epsilon_I \times (\sqrt{\epsilon_{II}} \times \sin\theta - i\lambda/\Lambda s)^2\}^{1/2}\right)$$

Here $z_0$ is a unit vector in the z-axis direction.

The wave vector in region III, too, is likewise given by $$k_{IIIi} = 2\pi/\lambda \times \sqrt{\epsilon_{III}} \times \left(1/\sqrt{\epsilon_{III}} \times (\sqrt{\epsilon_{II}} \times \sin\theta - i\lambda/\Lambda s), \right. \quad (25)$$

$$\left. 0, \{1 - 1/\epsilon_{III} \times (\sqrt{\epsilon_{II}} \times \sin\theta - i\lambda/\Lambda s)^2\}^{1/2}\right)$$

Equations (24) and (25) indicate that the wave vector of diffracted light emerging from the phase type volume hologram is dependent on its surface grating spacing rather than on the three-dimensional structure of the grating (interference fringes).

It is thus understood that as is the case with a thin hologram, the direction of diffraction of light emerging from the phase type volume hologram is determined by the grating (interference fringes) spacing on its surface.

For P-polarized light, the wave equation in the hologram with respect to a magnetic field H is written as follows:

$$\nabla^2 H - (\nabla\epsilon/\epsilon \times \nabla)H + k^2\epsilon H = 0 \quad (26)$$

If, as is the case with S-polarized light, Floquet's theorem is used, then the magnetic field H in the hologram may be represented as $$H = \Sigma U_i(z)\exp(-j\sigma_i \cdot r) \quad (27)$$

Here $U_i(z)$ is the magnitude of an i-th diffracted light at the magnetic field.

For the P-polarized light, too, it is understood that as is the case with the S-polarized light, an i-th diffracted light emerging from the hologram has a hologram surface tangent component of its wave vector preserved according to phase matching conditions, and wave vectors in regions I and III are the same as those given by equations (24) and (25), so that the direction of diffraction of light is determined by the grating (interference fringes) spacing on the surface of the hologram.

For an amplitude type hologram, too, electromagnetic waves propagating therethrough may be described as in equations (15) and (27) according to Floquet's theorem.

Accordingly, the direction of diffraction of light is determined by the grating (interference fringes) spacing on the hologram surface as is the case with the phase type volume hologram.

It is thus found that as is the case with a thin hologram, the direction of diffraction of light by the volume hologram is determined by the interference fringe spacing on the hologram surface rather than by the three-dimensional structure of the grating (interference fringes).

It is here noted that the holograms are identical with one another in terms of interference fringe shape and spacing includes not only the case where they are identical with one another at the same place but also cases where the tilts of interference fringes vary within the range of ±5°, preferably ±1°, and the spacing of interference fringes vary within the range of ±5%, preferably ±1%.

With the optical system of the present invention wherein the interior thereof is filled with a transparent medium having a refractive index of greater than 1, for instance, glass or plastic material, the optical power defined by the reflecting surface and the reflection hologram plane upon reflection can be ensured at an ever gentler radius of curvature, R. It is thus possible to reduce, or make satisfactory correction for, aberrations produced at each reflecting surface. Since the interior of the optical system is constructed of a transparent medium having a refractive index of greater than 1, a refracting surface is positioned in front of the image plane, so that satisfactory correction of distortion can be made.

Preferably in the optical system of the present invention, the first and second prisms should be formed of the same type medium.

It is also preferable that the shape of the surface of the first prism to which the volume hologram element is cemented is substantially the same as the shape of the surface of the second prism to which the volume hologram element is cemented.

It is here noted that the phrase "substantially the same" implies that surface shape differences within the margin of errors on production are permissible.

Generally in the optical system of the present invention, the volume hologram element is a film type plane hologram. The surface of the first prism that is one substrate to which the plane hologram element is applied, and the surface of the second prism that is another substrate to which the plane hologram element is applied, should be in a planar or cylindrical form.

Here reference is made to specific embodiments of what arrangements the surfaces of the first and second prisms are positioned in. Some examples will be given later. As viewed in order of a ray propagating from the optical pupil to the image plane, the first prism should preferably comprise, at least, a first entrance surface for entering a ray from the optical pupil into the first prism and a first exit surface through which the ray leaves the first prism with a first prism medium filled between them. The second prism should preferably comprise, at least, a first entrance surface for entering the ray emerging from the first prism into the second prism, a reflecting surface for reflecting the ray within the second prism and a second exit surface through which the ray leaves the second prism, with a second prism medium filled between them. Preferably in the second prism, that reflecting surface should be configured in such a concave curved shape as to give positive power to the ray on reflection.

It is then preferable that the first entrance surface of the first prism in the optical system of the present invention is configured in such a curved shape as to give power to the ray on transmission, and the second exit surface of the second prism is configured in such a curved shape as to give power to the ray on transmission.

Preferably in the optical system of the present invention, a ghost light removal member for preventing the ghost light from striking on the eyeball of an observer should be provided on an optically inactive surface of the first and second prisms other than the optically active surfaces for transmitting and reflecting light rays.

When the second exit surface of the second prism is defined as the upper surface, it is effective to provide such ghost light removal members on the bottom and side of the optical member. The "optically active surface" also includes areas outside of the effective ray diameter in the second exit surface, outside of the effective ray diameter in the reflecting surface of the second prism, and outside of the effective ray diameter in the first entrance surface of the first prism. It is also effective to provide such members at these areas.

Preferably in the optical system of the present invention, the rotationally asymmetric curved shape of the first entrance surface has an action on correction of rotationally asymmetric aberrations.

Preferably in the optical system of the present invention, the rotationally asymmetric curved shape of the first entrance surface of the first prism is constructed of a free-form surface having only one symmetric plane that should preferably be in coincidence with the turn-back plane (Y-Z plane) of the optical axis.

Preferably in the optical system of the present invention, the shape of the second exit surface of the second prism is a rotationally asymmetric free-from shape.

Thus, if the transmitting surface (the second exit surface of the second prism) is positioned at the front surface of an image display element (in the case of a viewing optical system with the image display element disposed at the image plane while a light beam propagates in the backward direction from the optical pupil to the image plane) or an image pickup element (in the case of an image pickup optical system with the image pickup element located at the image plane while a light beam propagates in the forward direction from the optical pupil to the image plane), it is then possible to make satisfactory correction for distortions. It is noted that while the front surface of this image display element or image pickup element may be constructed of a rotationally symmetric shape, it is more preferable to have recourse to a free-form surface so as to correct decentration aberrations occurring when optically active surfaces are decentered for the purpose of slimming down the optical system.

Preferably in the optical system of the present invention, the rotationally asymmetric curved shape of the second exit surface of the second prism is constructed of a free-form surface having only one symmetric plane that should preferably be in coincidence with the turn-back plane (Y-Z plane) of the optical axis.

In the present invention, while the surfaces forming the first prism and the surfaces forming the second prism should preferably be constructed of rotationally asymmetric surfaces such as free-form surfaces for the purpose of achieving an optical system having satisfactory telecentric properties with well-corrected rotationally asymmetric distortions, it is understood that they may be constructed of rotationally symmetric surfaces such as spherical, and aspheric surfaces or, alternatively, anamorphic surfaces.

Preferably in the optical system of the present invention, chromatic aberrations of magnification of both the rotationally symmetric component and the rotationally asymmetric component are corrected by allowing the volume hologram element to reflect and diffract light rays.

Thus, correction of chromatic aberrations of magnification of both the rotationally symmetric component and the rotationally asymmetric component with the reflection volume hologram element ensures high contrasts.

In order to take advantage of the angle selectivity of a reflection volume hologram element thereby achieving the beam splitter function, it is desired for the optical system of the present invention to satisfy at least one of the following conditions (1) and (2):

$$-0.20 < PX4/PX < 0.50 \quad (1)$$

$$-0.20 < PY4/PY < 0.30 \quad (2)$$

Here assume that the direction of an axial chief ray passing through the center of the optical pupil is the Z-axis direction, the decentration direction of the optical system and optical surfaces is the Y-axis direction and the direction perpendicular to the Y-axis and Z-axis is the X-axis direction, and let $\delta y$ indicate the angle of a ray leaving the optical system with respect to an axial chief ray upon projected onto the Y-Z plane with the proviso that said ray leaves the optical system when a ray having a minute height, d, is entered from the optical pupil side into the Y-Z plane parallel with the axial chief ray, $\delta y/d$ indicate the power, PY, of the optical system in the Y-direction, $\delta x$ indicate the angle of a ray leaving the optical system with respect to an axial chief ray upon projected onto a plane perpendicular to the Y-Z plane and including that axial chief ray with the proviso that said ray leaves the optical system when a ray having a minute height, d, is entered from the optical pupil side into the X-Z plane parallel with the axial chief ray, and $\delta x/d$ indicate the power, PX, of the optical system in the X direction. Likewise, assume that PY4 and PX4 are the powers of the reflecting surface in the second prism forming part of the optical system in the Y and X directions, respectively.

When the values of the aforesaid conditions (1) and (2) are less than the lower limits of −0.20, the optical power of the decentered reflecting surface becomes too large in a negative direction to correct decentration aberrations produced at that reflecting surface. There are also large variations in the angle of incidence of light rays on the reflection hologram plane upon transmission, resulting in multiple diffraction. Consequently, it is difficult to display high-definition images or the volume hologram element fails to function as a beam splitter.

When the values of the aforesaid conditions (1) and (2) are greater than the respective upper limits of 0.50 and 0.30, the optical power of the decentered reflecting surface becomes too large in a negative direction to correct decentration aberrations produced at that reflecting surface. There are also large variations in the angle of incidence of light rays on the reflection hologram plane upon transmission, resulting in multiple diffraction. Consequently, it is difficult to display high-definition images or the volume hologram element fails to function as a beam splitter.

More preferably, the optical system of the present invention should satisfy at least one of the following conditions (1-1) and (2-1):

$$0.00 < PX4/PX < 0.35 \quad (1-1)$$

$$-0.10 < PY4/PY < 0.20 \quad (2-1)$$

The lower and upper limits to these conditions have the same meanings as described above.

Even more preferably, the optical system of the present invention should satisfy at least one of the following conditions (1-2) and (2-2):

$$0.15 < PX4/PX < 0.25 \quad (1-2)$$

$$0.00 < PY4/PY < 0.10 \quad (2-2)$$

The lower and upper limits to these conditions have the same meanings as described above.

In Example 1 given later, the values of these conditions are as follows.

PX4/PX=0.190

PY4/PY=0.045

The optical system of the present invention may also be embodied as a viewing optical system comprising a two-dimensional image display element disposed at the image plane, so that an image on the two-dimensional image display element can be observed on an enlarged scale.

For instance, this embodiment may be a head-mounted type image display device comprising a body portion built in as the viewing optical system, a support member for supporting said body portion over the head of an observer in such a way that the optical pupil of the viewing optical system is kept at the eyeball position of the observer, and a speaker member for transmitting sounds to the ear of the observer.

Alternatively, that body portion may comprise a viewing optical system for the right eye and a viewing optical system for the left eye, and that speaker member may comprise speaker means for the right ear and speaker means for the left ear. In this case, an earphone may be used as that speaker member.

The optical system of the present invention may be applied not only to viewing systems but also to image pickup systems. An image pickup system may have an image pickup element disposed at the image plane, so that object light can be entered from the optical pupil side into the image pickup system to pick up an object image.

It is here noted that the axial chief ray for a viewing optical system is defined by backward tracing of a light ray passing through an optical pupil center forming an exit pupil and arriving at the center of a two-dimensional image display element, and the axial chief ray for an image pickup optical system is defined by forward tracing of a light ray passing through an optical pupil center forming an aperture stop and arriving at the center of an image pickup element. Then, the optical axis is defined by a straight line form of axial chief ray leaving the center of the exit pupil or aperture stop and intersecting as far as the first entrance surface of the first prism and the Z-axis is defined by this optical axis. The Y-axis is defined by an axis perpendicular to the Z-axis and found in the decentered planes forming the first prism, and an axis perpendicular to the Z-axis and the Y-axis is defined as the X-axis. The center of the exit pupil or aperture stop is defined as the origin of a coordinate system for the viewing or image pickup optical system of the present invention. In the present invention, the surface numbers are given according to the backward ray tracing from the exit pupil toward the two-dimensional image display element or according to the forward ray tracing from the aperture stop toward the image pickup element. The direction of the axial chief ray propagating from the exit pupil to the two-dimensional image display element or from the aperture stop to the image display element is defined as the positive direction of the Z-axis, the direction of the Y-axis toward the two-dimensional image display element or toward the image pickup element as the positive direction of the Y-axis, and the direction of the X-axis forming a right hand system with the Y-axis and Z-axis as the positive direction of the X-axis.

Here the free-form surface used herein is defined by the following equation (a). It is noted that the Z-axis of this defining equation provides the axis of the free-form surface.

$$Z = cr^2 / \left[1 + \sqrt{\{1 - (1+k)c^2 r^2\}}\right] + \sum_{j=2}^{\infty} C_j X^m Y^n \quad (a)$$

In equation (a), the first term is a spherical term and the second term is a free-form surface term.

In the spherical term, c is the curvature of the apex, k is a conic constant (conical constant), and $r = \sqrt{(X^2 + Y^2)}$ The free-form term is $$\sum_{j=2}^{\infty} C_j X^m Y^n = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7$$

Here Cj (j is an integer of 2 or greater) is a coefficient with the proviso that $j = \{(m+n)^2 + m + 3n\}/2 + 1$ (m and n are each an integer of greater than 0).

In general, the aforesaid free-form surface has no symmetric surface at both the X-Z plane and the Y-Z plane. However, by reducing all the odd-numbered terms for X to zero, that free-form surface can have only one symmetric surface parallel with the Y-Z plane. For instance, this may be achieved by reducing to zero the coefficients for the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . .

By reducing all the odd-numbered terms for Y to zero, the free-form surface can have only one symmetric surface parallel with the X-Z plane. For instance, this may be achieved by reducing to zero the coefficients for the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . .

By defining any one of the directions of the aforesaid symmetrical surface as a symmetrical surface and setting decentration in the corresponding direction, for instance, setting the direction of the optical system with respect to a symmetrical surface parallel with the Y-Z plane in the Y-axis direction and the direction of the optical system with respect to a symmetrical surface parallel with the X-Z plane in the X-axis direction, it is possible to make effective correction for rotationally asymmetric aberrations produced due to decentration while, at the same time, productivity is improved.

The aforesaid defining equation (a) is merely provided as an example. The present invention has the feature of using a rotationally asymmetric surface having only one symmetric surface thereby correcting rotationally asymmetric aberrations produced due to decentration and, at the same time, improving productivity. However, it is understood that similar effects are obtainable even for any defining equations other than the aforesaid defining equation (a).

In the present invention, the reflecting surface provided at the second prism may be formed in a free-form surface shape symmetrical with respect to plane, which has only one symmetric plane.

The volume hologram (HOE) of the volume hologram element according to the present invention is defined as follows. FIG. 11 is illustrative of the principle for giving a definition of HOE according to the present invention.

First of all, ray tracing of wavelength λ entering and leaving an HOE plane is given by the following equation (b), using an optical path difference function $\Phi_0$ on the HOE plane as defined with respect to the reference wavelength $\lambda_0$=HWL.

$$n_d Q_d \times N = n_i Q_i \times N + m(\lambda/\lambda_0) \nabla \Phi_0 \times N \quad (b)$$

Here N is the normal vector of the HOE plane, $n_i$ ($n_d$) is the refractive index of the entrance (emergence) side, $Q_i$ ($Q_d$) is the entrance (emergence) vector (in vector), and m=HOR is the order of diffraction of emergent light.

If the HOE is fabricated (defined) by interference of object light from a two-point light source for the reference wavelength $\lambda_0$, i.e., a light source of point $P_1$=(HX1, HY1, HZ1) as shown in FIG. 12 and reference light from a light source of point $P_2$=(HX2, HY2, HZ2), then $$\Phi_0 = \Phi_0^{2P} = n_2 \cdot s_2 \cdot r_2 - n_1 \cdot s_1 \cdot r_1$$

where $r_1$ ($r_2$) is the distance (>0) from point $P_1$ ($P_2$) to given coordinates P on the HOE plane, $n_1$ ($n_2$) is the refractive index of the medium on which the HOE is positioned at the time of fabrication (definition) and the point $P_1$ ($P_2$) is located, and $s_1$=HV1, and $s_2$=HV2 is a symbol for taking the direction of propagation of light into consideration. This symbol is REA=+1 in the case where the light source is a divergent (real point) light source, and VIR=−1 in the case where the light source is a convergent (virtual point) light source. In conjunction with the definition of the HOE in lens data, it is noted that the refractive index $n_1$ ($n_2$) of the medium on which the HOE is placed at the time of fabrication (definition) is defined by the refractive index of the side of the medium contiguous to the HOE plane in the lens data, on which the point $P_1$ ($P_2$) is found.

Generally, the reference light and object light used for HOE fabrication are not always limited to spherical waves.

In this case, the optical path difference function $\Phi_0$ for the HOE may be expressed in terms of the following equation (c) with the addition thereto of an additive phase term $\Phi_0^{Poly}$ (an optical path difference function at the reference wavelength $\lambda_0$) represented by a polynominal.

$$\Phi_0 = \Phi_0^{2P} + \Phi_0^{Poly} \quad (c)$$

Here, the polynominal is $$\Phi_0^{Poly} = \sum_j H_j \cdot x^m \cdot y^n$$
$$= H_1 x + H_2 y + H_3 x^2 + H_4 xy + H_5 y^2 +$$
$$H_6 x^3 + H_7 x^2 y + H_8 xy^2 + H_9 y^3 + \ldots$$

In general, this may be defined by $$j = \{(m+n)^2 + m + 3n\}/2$$

Here, $H_j$ is the coefficient of each term.

For convenience of optical design, the HOE may be defined by representing the optical path difference function $\Phi_0$ in terms of the additive term alone, as in the case of $$\Phi_0 = \Phi_0^{Poly}$$

For instance, if light beams from the two-point light source $P_1$ ($P_2$) are in coincidence with each other, the component $\Phi_0^{2P}$ of the optical path difference function $\Phi_0$ by interference is then reduced down to zero. This is tantamount to the case where the optical path difference function is substantially represented by the additive term alone.

All the aforesaid explanation of the HOE holds true for local coordinates using the origin of the HOE as reference.

Exemplified below are the constructive parameters for the definition of the HOE.

| Surface No. | Radius of Curvature | Surface Spacing |
|---|---|---|
| Object Plnae | ∞ | ∞ |
| 1 | ∞ (stop) | 100 |
| 2 | 150 (HOE①) HOE① | −75 |
| HV1 ($s_1$): REA (+1) | | |
| HV2 ($s_2$): VIR (−1) | | |
| HOR (m): 1 | | |
| HX1 = 0 | HY1 = −3.40 × 10⁹ | HZ1 = −3.40 × 10⁹ |
| HX2 = 0 | HY2 = 2.50 × 10 | HZ2 = −7.04 × 10 |
| HWL ($\lambda_0$) = 544 | | |
| H1 −1.39 × 10⁻²¹ | H2 −8.57 × 10⁻⁵ | H3 −1.50 × 10⁻⁴ |

In Example 1 given later, the hologram element is defined as composed of only one HOE① layer that diffracts the red band light with its center at 630-nm wavelength in an angle selective manner. Regarding the HOE for the blue band light with its center at 470-nm wavelength and the HOE for the green band light with its center at 535-nm wavelength, however, no optical path difference function is given. This is because the shape and spacing of interference fringes on the surface of the hologram are the same as those of HOE① for the red band light, and so is the optical path difference function $\Phi_0$ represented by equation (c). It is here noted that the spacings and tilts of the interference fringes in the hologram medium of each HOE differ as a matter of course; the spacings and tilts of the interference fringes in the hologram medium of each HOE at discrete six points in the hologram plane are indicated to show three or the red, green and blue volume holograms.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

Example 1 of the optical system according to the present invention is now explained.

Figure 1:
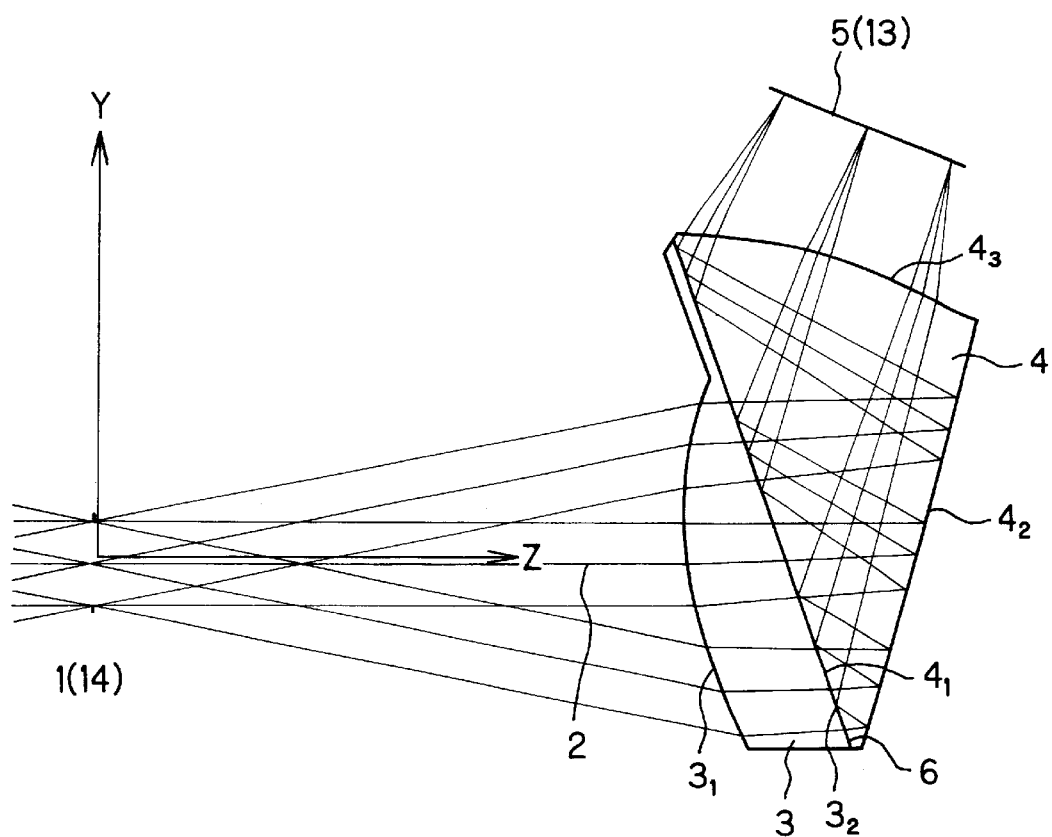
FIG. 1 is a Y-Z sectional schematic illustrative of Example 1 of the optical system of the present invention, including its optical axis.

The constructive parameters of Example 1 will be set forth later. Example 1 is directed to a viewing optical system. As shown in FIG. 1, an axial chief ray 2 is defined by a light ray leaving the center of an exit pupil 1 (the center position of rotation of the eyeball of an observer) and arriving at the center of an LCD 5 provided as a two-dimensional image display element through a first prism 3 and a second prism 4. An optical axis is defined by a straight line form of axial chief ray 2 propagating as far as a surface $3_1$ of the first prism 3 on the exit pupil 1 side, and the Z-axis is defined by this optical axis. An axis perpendicular to the Z-axis and found in the decentered planes of the prism-forming surfaces is defined as the X-axis, and an axis perpendicular to the optical axis and perpendicular to the Y-axis is defined as the Z-axis. The center of the exit pupil 1 is defined as the origin of the coordinate system. The direction of the axial chief ray 2 propagating from the exit pupil 1 to LCD 5 is defined as the positive direction of the Z-axis, the direction of the Y-axis toward LCD5 as the positive direction of the Y-axis, and the direction of the X-axis forming a right hand system with the Y-axis and Z-axis as the positive direction of the X-axis.

In Example 1, the first prism 3 and second prism 4 are decentered in the aforesaid Y-Z plane, and only one symmetric plane for each rotationally asymmetric surface of the first prism 3 and second prism 4 is given by the Y-Z plane.

Given for a decentered surface are the amount of decentration of the apex of that surface from the center of the origin of the optical system in the X, Y and Z-axis directions) and the angles ($\alpha$, $\beta$, $\gamma(°)$) of tilt of the center axis (the Z axis in the following formula (a) for a free-form surface) with respect to the X axis, the Y axis, and the Z axis, respectively. It is here noted that the positive $\alpha$ and $\beta$ mean counterclockwise rotation with respect to the positive directions of the respective axes, and the positive $\gamma$ means clockwise rotation with respect to the positive direction of the Z axis. Regarding how to how to perform rotation $\alpha$, $\beta$ and $\gamma$ around the center axis of the surface, it is noted that the center axis of the surface and its XYZ orthogonal coordinates are rotated counterclockwise around the X-axis by $\alpha$, the center axis of the rotated surface is rotated counterclockwise around a new coordinate system by $\beta$, the once rotated coordinate system is rotated counterclockwise around the Y-axis by $\beta$, and the center axis of the twice rotated surface is rotated clockwise around the Z-axis of a new coordinate system by $\gamma$.

Regarding the optically active surfaces forming the optical system of Example 1, when a specific surface and the subsequent surface form a coaxial optical system, a surface spacing is given. Besides, the radii of curvature of spherical surfaces, the refractive indices of media and Abbe's numbers are given as usual.

The free-form surface used herein is of such a shape as defined by the aforesaid equation (a), and the Z-axis of that defining equation is the axis of the free-form surface.

Among the defining equations for other free-form surfaces, there is Zernike polynomial given by the following formula (d). The axis of Zernike polynomial is given by the Z-axis of the defining formula. The rotationally asymmetric surface is defined by polar coordinates for the height of the Z-axis with respect to the X-Y plane provided that R is the distance from the Z axis within the X-Y plane and A is the azimuth angle round the Z axis, as expressed by the angle of rotation measured from the X-axis.

x=R×cos (A)
y=R×sin (A)

$$Z = D_2 + D_3 R\cos(A) + D_4 R\sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) + D_{11} R^3 \sin(3A) +$$
$$D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) + D_{21}(5R^5 - 4R^3)\sin(3A) +$$
$$D_{22} R^5 \sin(5A) + D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) + D_{28}(6R^6 - 5R^4)\sin(4A) +$$
$$D_{29} R^6 \sin(6A)$$
(d)

Here Dm (m is an integer of 2 or greater). It is noted that when this free-form surface is designed in the form of an optical system symmetric in the X-axis direction, $D_4$, $D_5$, $D_6$, $D_{10}$, $D_{11}$, $D_{12}$, $D_{13}$, $D_{14}$, $D_{20}$, $D_{21}$, $D_{22}$, . . . are used.

The shape of a rotationally asymmetric free-form may also be defined by the following equation (e). The Z-axis of that defining equation (e) provides the axis of the rotationally asymmetric surface.

$$Z = \Sigma_n \Sigma_m C_{nm} X^n Y^{n-m}$$
(e)

Here $\Sigma_n$ represents that n for $\Sigma$ is in the range of 0 to k, and $\Sigma_m$ represents that m for $\Sigma$ is in the range of 0 to n.

In Example 1 of the present invention, the shape of the free-from surface is expressed in terms of the aforesaid equation (a). However, it is understood that similar actions and effects are obtainable even by use of the aforesaid equations (d) and (e).

Example 1 is now specifically explained. In this example, the present invention is explained with reference to an image display device using a viewing optical system.

FIG. 1 is a Y-Z sectional schematic of a viewing optical system according to Example 1 of the present invention.

The viewing optical system according to this example comprises an LCD 5 that is a two-dimensional image display element for displaying an image to be viewed by an observer and located on the image plane side, and an eyepiece optical member for guiding a viewing image formed by the two-dimensional image display element to an exit pupil 1 formed at the position (pupil plane) of the eyeball of the observer for observing purposes.

The eyepiece optical member comprises a first prism 3 and a second prism 4. It is here noted that the surface numbers for the optical system are in principle given in order of ray tracing from the exit pupil 1 to LCD 5 (backward ray tracing). The same holds true for the surfaces of the first and second prisms.

The first prism 3 comprises a first entrance surface $3_1$ and a first exit surface $3_2$ with a transparent prism medium such as glass or plastics sandwiched between them.

The second prism 4 comprises a second entrance surface $4_1$, a reflecting surface $4_2$ and a second exit surface $4_3$ with a transparent prism medium such as glass or plastics sandwiched between them.

The first prism 3 and the second prism 4 are integrated together while a reflection volume hologram (HOE) 6 acting as a hologram element is sandwiched between them.

It is here noted that both the first prism 3 and the second prism 4 are formed of the same prism medium, e.g., glass or plastics.

The second exit surface $4_3$ of the second prism 4 is located on the LCD 5 side and has an action of transmitting a light ray from an image under observation and entering the light ray into the second prism 4. This surface is configured in such a free-form surface shape having only one symmetric surface as to give power to that light ray upon transmission.

The reflecting surface $4_2$ has an action of reflecting the light ray in the second prism 4, and is configured in such a concave curved shape (a free-form surface in this example) as to give positive power to the light ray upon reflection. The reflecting surface $4_2$ is also provided thereon with a mirror coating.

The second entrance surface $4_1$ is formed of a cylindrical surface having a curvature in the X-axis direction but no curvature in the Y-axis direction, and has an action of allowing the light ray to leave the second prism 4.

The first exit surface $3_2$ of the first prism 3 is located on the second prism 4 side and has an action of transmitting the light ray emerging from the second prism 4 and entering the light ray into the first prism 3. This surface is formed in substantially the same shape as that of the second entrance surface $4_1$ of the second prism 4.

The first entrance surface $3_1$ has an action of allowing the light ray to leave the first prism 3, and is formed in such a free-form surface shape having only one symmetric surface as to give power to the light ray upon transmission. This first entrance surface has also an action of correcting at least one of asymmetrical coma and astigmatism produced at the aforesaid eyepiece optical member.

Only one symmetrical surface of the first entrance surface $3_1$ of the first prism 3, the reflecting surface $4_2$ of the second prism 4, and the second exit surface $4_3$ of the second prism 4, each defined by a free-form surface, is in coincidence with the turn-back plane of the optical axis (Y-Z plane).

In the viewing optical system according to Example 1, red band light, green band light and blue band light emerging from LCD 5 are entered into the second prism 4 through the second exit surface $4_3$, striking on a volume hologram 6 applied over the second entrance surface $4_1$ at first, second and third angles of incidence, respectively. At this time, the incident red band light, green band light and blue band light are reflected and diffracted at the plane of the volume hologram 6 at first, second and third angles of reflection and diffraction with reflection/diffraction efficiencies of approximately 100%, propagating toward the reflecting surface $4_2$. Upon reflected at the reflecting surface $4_2$, they are incident on the volume hologram 6 applied over the second entrance surface $4_1$ at angles of incidences other than the first, second and third angles of incidence. Then, the angles of incidence depart from the angle selectivity for diffraction efficiency of the volume hologram 6 having high diffraction efficiency; the red band light, green band light, and blue band light leaves the second prism 4 through the volume hologram 6. Following this, the light beams are entered into the first prism 3 through the first exit surface $3_2$ of the first prism 3, and guided to the exit pupil 1 side upon passing through the first entrance surface $3_1$ and leaving the first prism 3.

While Example 1 of the present invention has been explained with reference to the viewing optical system, it is understood that if, instead of LCD 5, an image pickup element 13 is disposed at the image plane of the viewing optical system and an aperture stop 14 for stopping down the brightness of a light beam from an object is disposed at the exit pupil 1, it is then possible to make up an image pickup optical system.

In that case, the second exit surface $4_3$ of the second prism 4 functions as a surface through which the light ray leaves the second prism 4, and the second entrance surface $4_1$ acts as a surface for entering the light ray into the second prism 4. The first exit surface $3_2$ of the first prism 3 functions as a surface through which the light ray leaves the first prism 3, and the first entrance surface $3_1$ acts as a surface for entering a light ray emanating from an object and transmitting through the aperture stop 14 into the first prism 3.

The volume hologram 6 is constructed by laminating three R, G and B layers or triple recording. As already explained, the hologram layer for the red band light with its center at 630-nm wavelength, the hologram layer for the green band light with its center at 525-nm wavelength and the hologram layer for the blue band light with its center at 470-nm wavelength are the same in terms of interference fringe shape and spacing on the surfaces of the holograms but differ in terms of interference fringe spacing and tilt in the medium of the holograms.

At an area where the volume hologram 6 is used as a beam splitter having recourse to a combined reflection/diffraction and transmission action of the hologram plane, the angle of the chief ray with respect to the normal to the hologram plane is in the angle range of 50.6° to 54.6° upon reflection and diffraction. In this case, chromatic aberrations produced at other refracting surfaces $4_3$ and $3_1$ of the optical system are canceled using the optical power of the volume hologram 6 that also acts as a diffraction element, so that chromatic aberrations of magnification of rotationally symmetric and asymmetric components can be corrected. The incident light ray emerges at an angle of diffraction substantially approximate to direction reflection. At an area where the volume hologram 6 is used as a beam splitter having recourse to a combined reflection/diffraction and transmission action of the hologram plane, the angle of the chief ray with respect to the normal to the hologram plane is in the angle range of −16.2° to −18.2° upon transmission.

Figure 7:
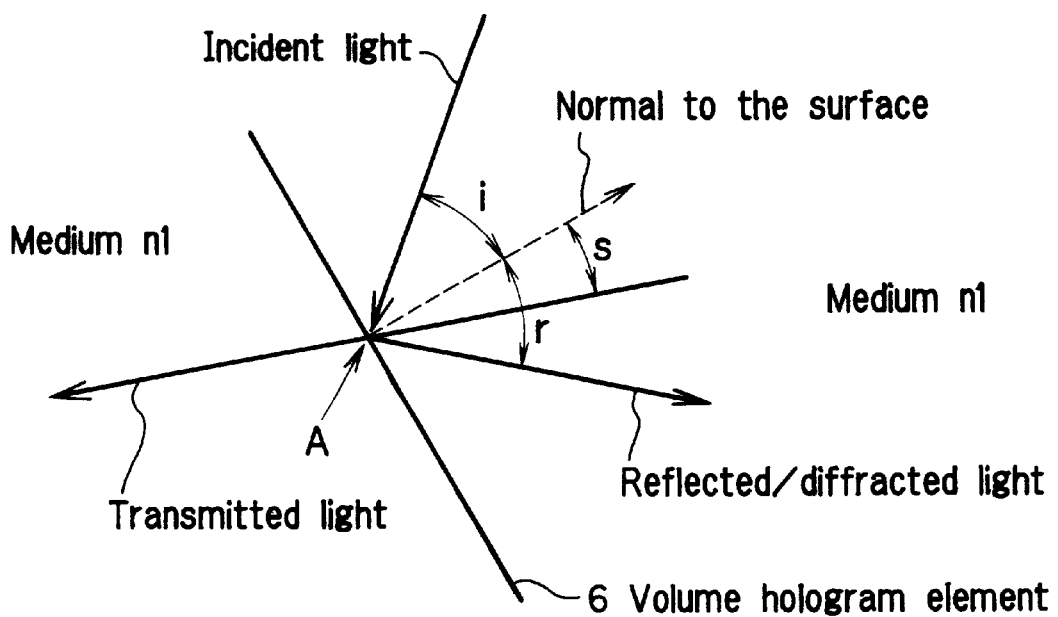
FIG. 7 is illustrative of a simulation model for the diffraction efficiency of Example 1.
Figure 8A:
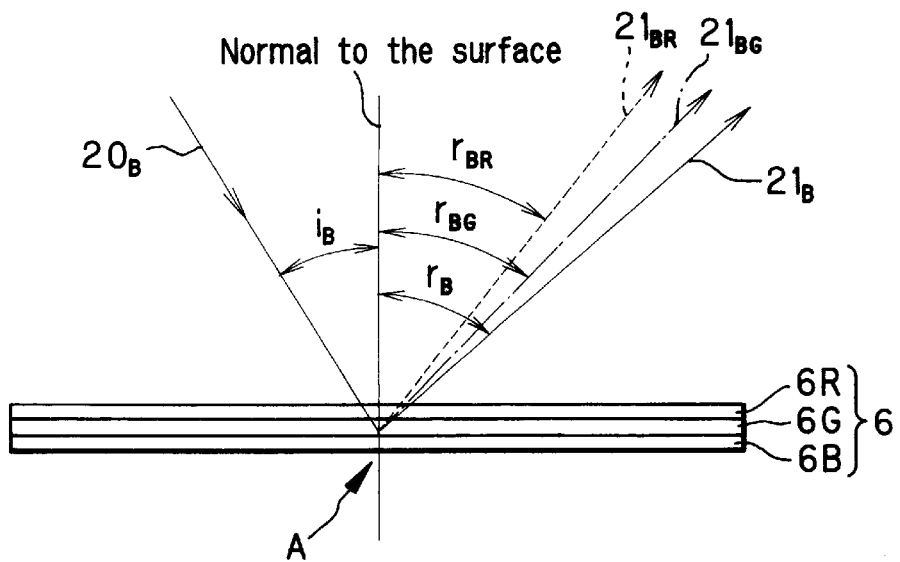
FIG. 8 is illustrative of the fundamental principles of the volume hologram element used in the present invention.
Figure 8B:
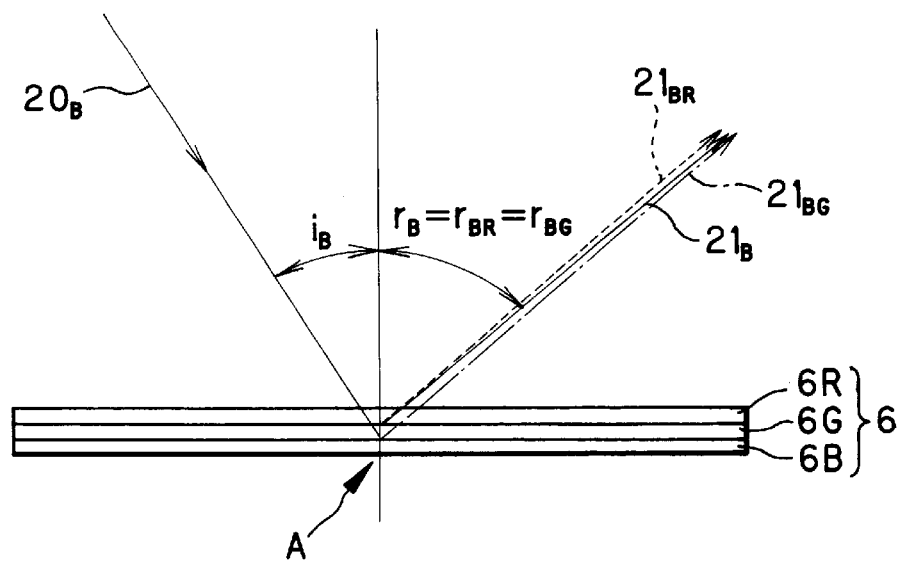
Figure 9:
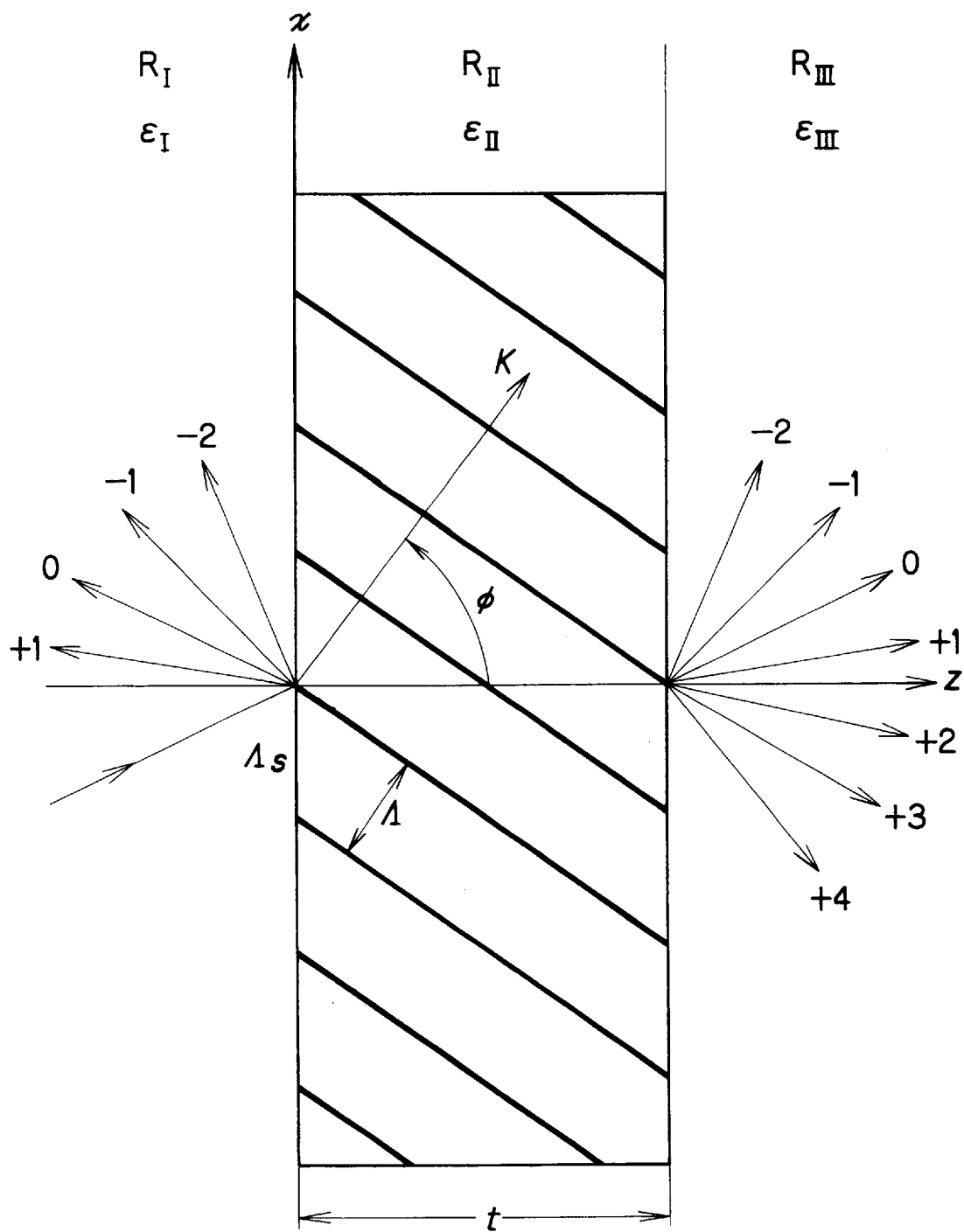
FIG. 9 is illustrative of the fact that the direction of diffraction of light by a volume hologram is determined by the interference fringe spacing on the surface of the hologram.

FIG. 7 is a model diagram for simulation of the diffraction efficiency of this example. Assume that the volume hologram element 6 cemented into a medium n1 has an average refractive index n, an amplitude of refractive index modulation Δn and a hologram thickness t. Then, at a certain coordinate position A of the volume hologram element 6, the light ray to be reflected and diffracted enters at an angle of incidence of i° and leaves at an angle of reflection and diffraction of r°, each with respect to the normal. At the coordinate position A of the volume hologram element 6, the light ray to be transmitted enters at an angle of incidence of s° with respect to the normal.

Figure 4:
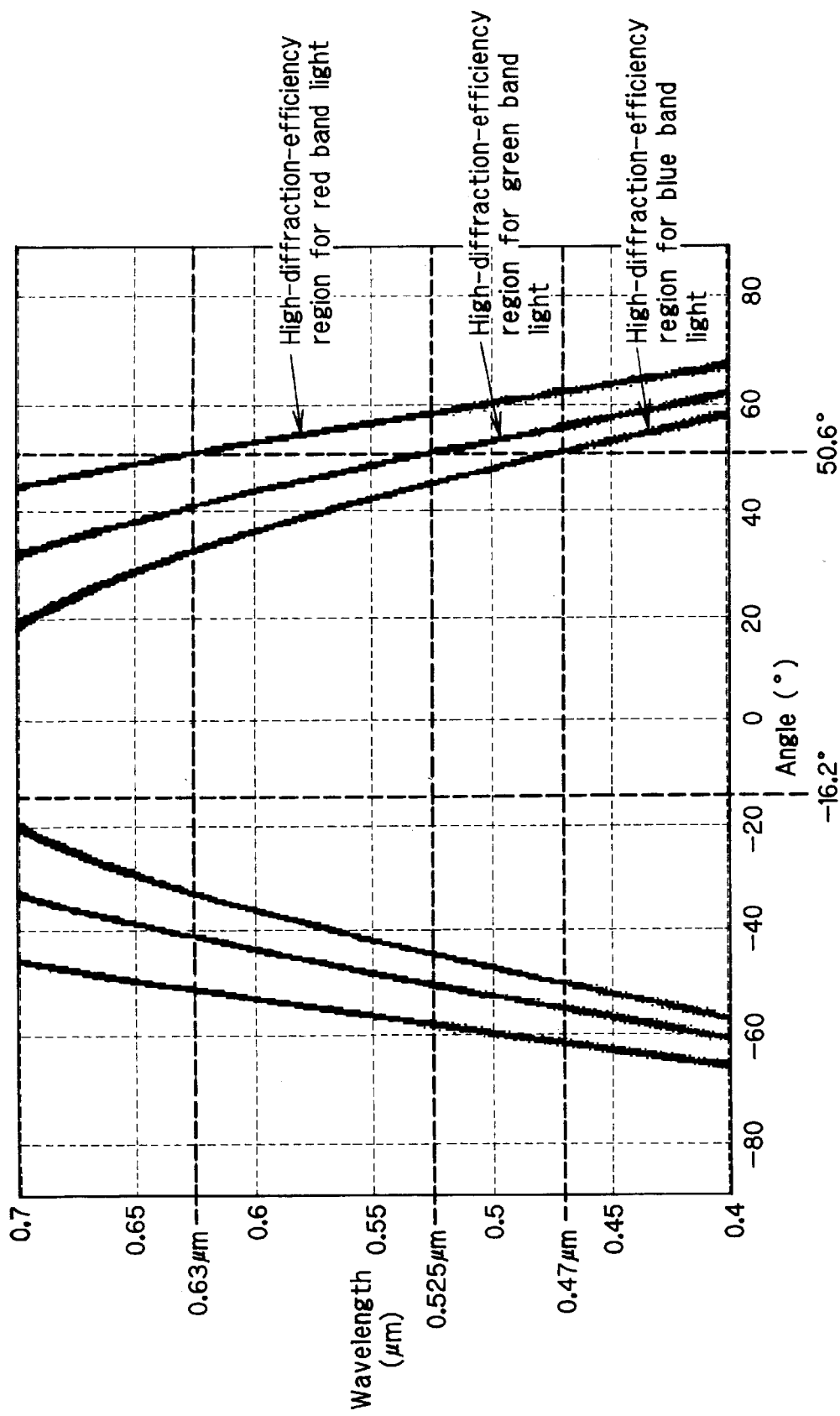
FIG. 4 is illustrative of the wavelength dependency of the angle of incidence of the red band light, green band light, and blue band light on high diffraction efficiency areas as evaluated at positions of the volume hologram in Example 1, where the angle of incidence is i=50.6° and the angle of reflection and diffraction is r=50.7°.
Figure 5:
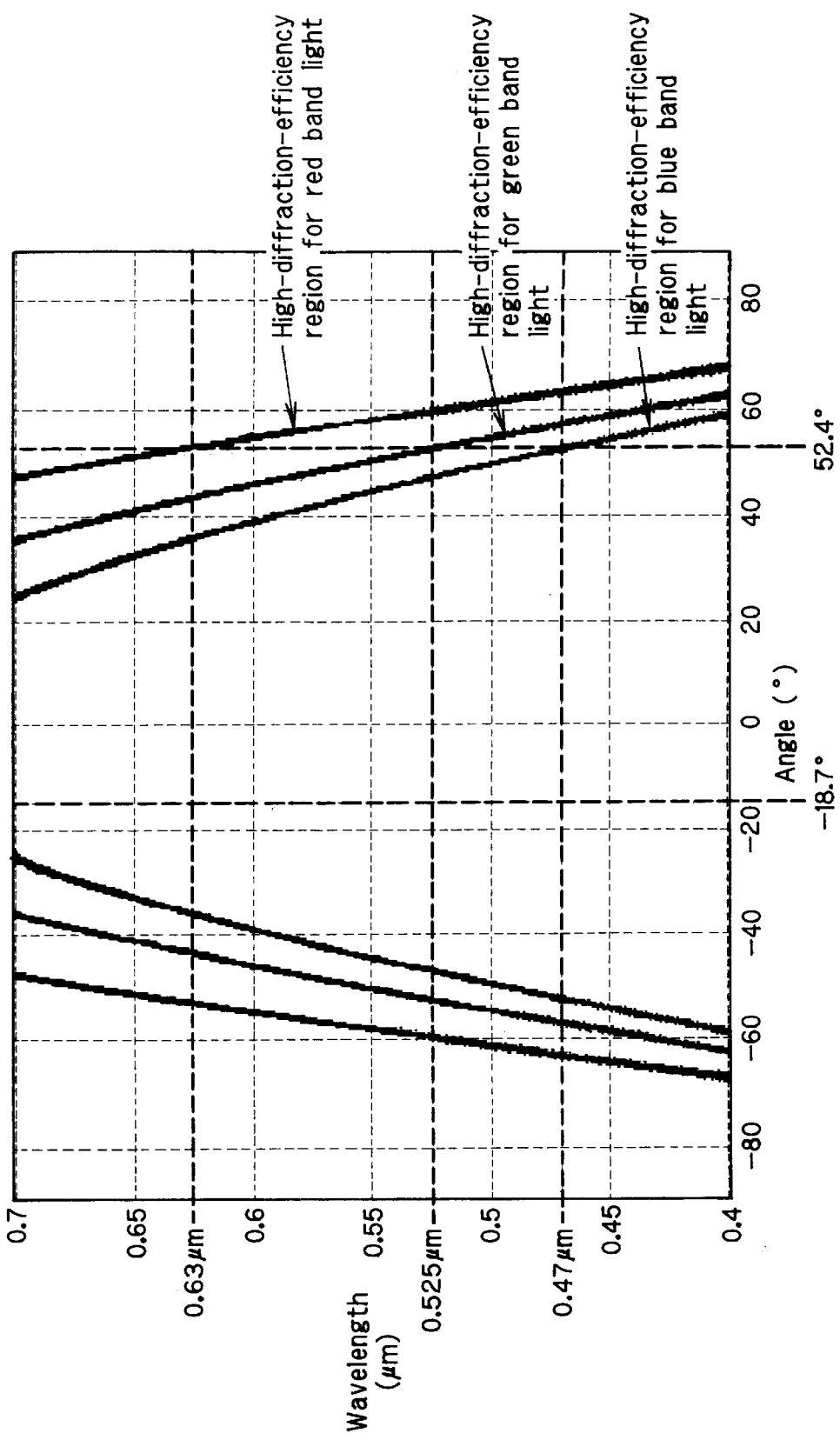
FIG. 5 is illustrative of the wavelength dependency of the angle of incidence of the red band light, green band light, and blue band light on high diffraction efficiency areas as evaluated at positions of the volume hologram in Example 1, where the angle of incidence is i=52.4° and the angle of reflection and diffraction is r=52.5°.
Figure 6:
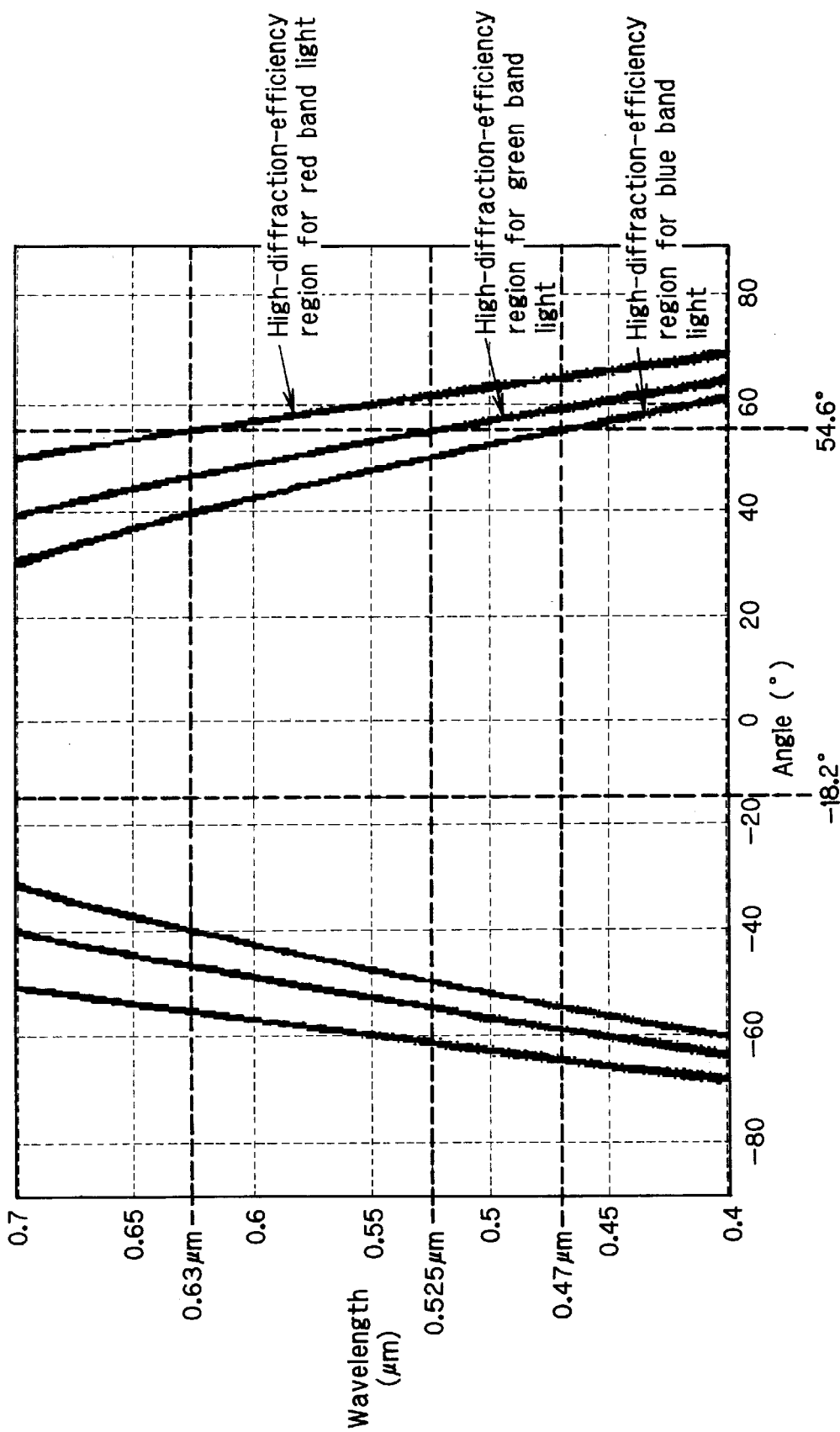
FIG. 6 is illustrative of the wavelength dependency of the angle of incidence of the red band light, green band light, and blue band light on high diffraction efficiency areas as evaluated at positions of the volume hologram in Example 1, where the angle of incidence is i=54.6° and the angle of reflection and diffraction is r=54.7°.

FIGS. 4–6 show the results of simulation of diffraction efficiency, which was carried out with the application of the following parameters to Kogelnik's coupled wave theory. Areas where the red band light, green band light and blue band light are each diffracted at a diffraction efficiency of 10% or greater are indicated in black.

The medium is n1=1.52, the average refractive index is n=1.52, the amplitude of refractive index modulation is Δn=0.017, the thickness is t=25 μm, the angle of incidence is i=50.6°, the angle of reflection and diffraction is r=50.7°, and the center wavelength of the band is 0.63 μm for red, 0.525 μm for green, and 0.47 μm for blue.

According to Kogelnik's Coupled Wave theory (The Bell System Technical Journal, Vol. 48, No. 9, pp. 2909–2497 (Nov. 1969), the diffraction efficiency, η, of the reflection hologram element 6 is given by the following equation (A) on condition that absorption by a medium is neglected.

$$\eta = 1/[1+(1-\xi^2/\nu^2)/\sin h^2\{\sqrt{(\nu^2-\xi^2)}\}] \quad (A)$$

wherein ν and ξ are given by $$\nu = \pi t \Delta n / \{1\sqrt{(\cos\theta_R \cdot \cos\theta_S)}\}$$

$$\xi = t/2 \times (k_{Rz} + K_z - k_{Sz})$$

Here:
t is the thickness of a photosensitive material,
λ is the wavelength in vacuum,
$\theta_R$ is the angle of incident light with respect to the vector of the normal to the hologram plane,
$\theta_S$ is the angle of diffracted light with respect to the vector of the normal to the hologram plane,
$k_{Rz}$ is the component of the wave vector of incident light in the direction of the normal to the hologram plane,
$k_{Sz}$ is the component of the wave vector of diffracted light in the direction of the normal to the hologram plane,
$K_z$ is the component of a diffraction grating vector in the direction of the normal to the hologram plane,
Δn is the amplitude of the refractive index modulation of a hologram medium, and
n is the average refractive index of the hologram medium.

Figure 10:
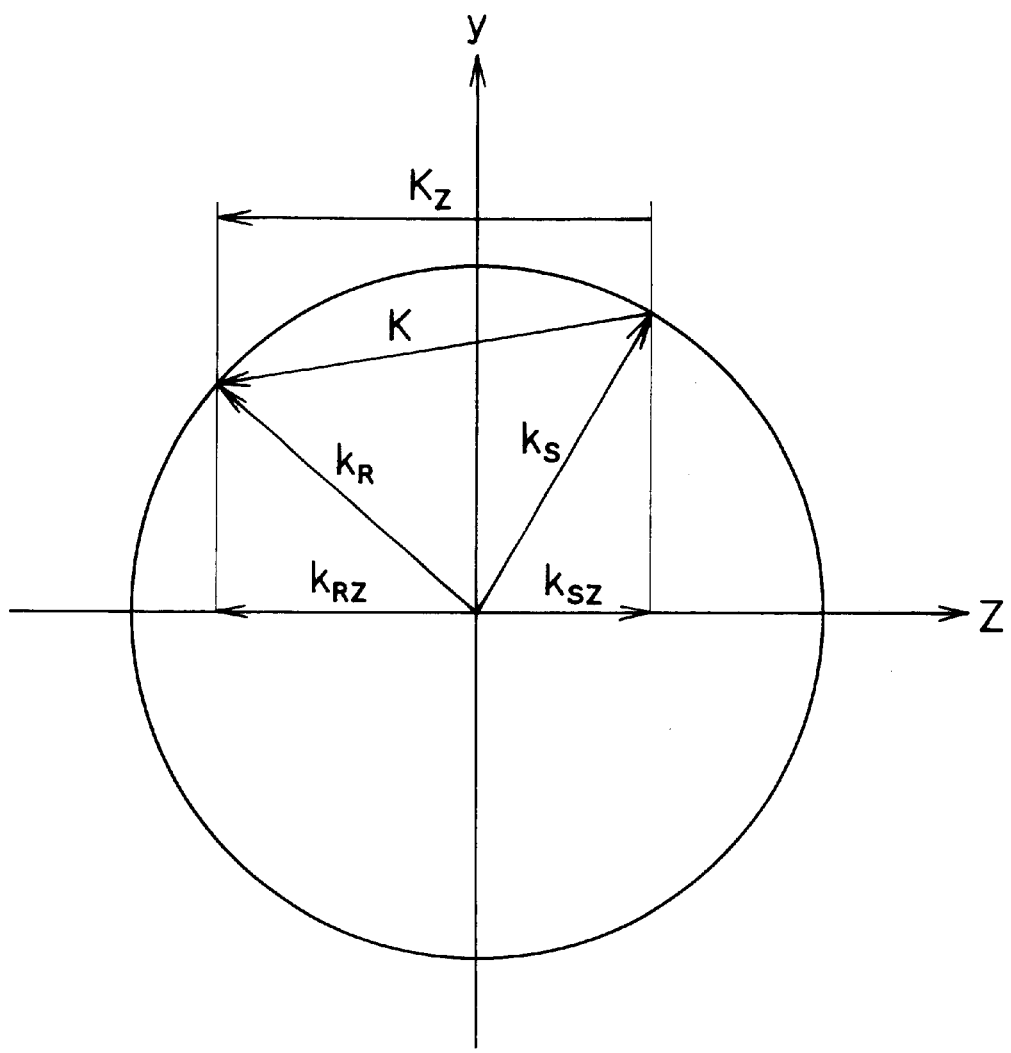
FIG. 10 is a vector diagram illustrative of relations between K, $k_R$, $k_S$, $K_z$, $K_{Rz}$ and $K_{Sz}$ in the case where Bragg condition is satisfied.
Figure 11:
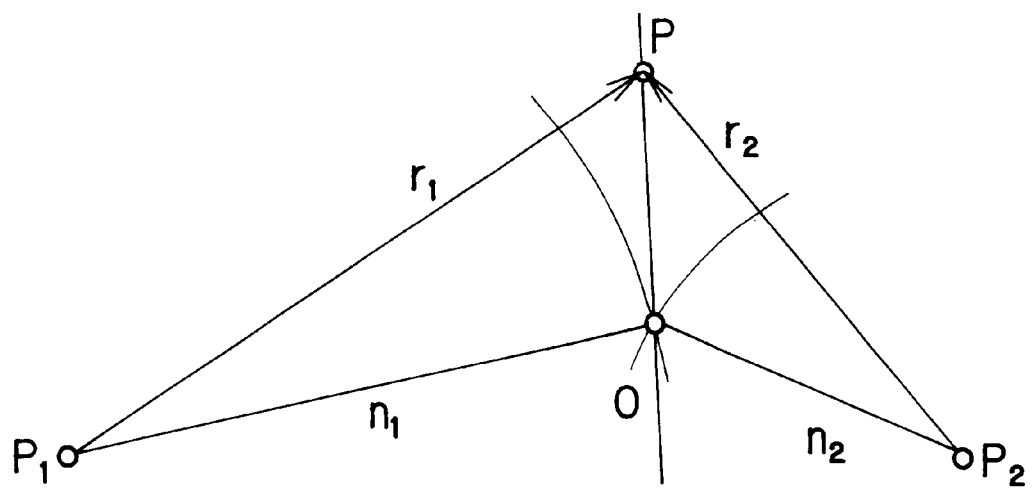
FIG. 11 is a principle view for giving a definition of the HOE according to the present invention.

Here the wave vector, k, of light is given by $|k|=2\pi n/\lambda$, and the diffraction grating vector, K, is a vector vertical to the interference fringe plane of a volume hologram, as given by $|k|=2\pi n/\Lambda$ where Λ is the period of the interference fringe (grating spacing). It is here noted that FIG. 10 is a vector diagram illustrative of what relations are found among K, $k_R$, $k_S$, $K_z$, $k_{Rz}$ and $k_{Sz}$ when Bragg condition is satisfied.

At a position of the volume hologram 6 in Example 1 where reflection and diffraction take place at the angle of incidence of i=50.6° in the angle range of 50.6° to 54.6° at the hologram plane and the angle of reflection and diffraction of r=50.7°, reentrance transmitted light is incident on the volume hologram 6 at −16.2°. From FIG. 4 it is seen that the reentrance transmitted light of 0.63 μm±20 μm wavelengths for red, of 0.525 μm±20 μm wavelengths for green and 0.47 μm±20 μm wavelengths for blue does not overlap the high-diffraction-efficiency area upon reentrance at an angle of incidence of −16.2°; that is, it is transmitted as such.

FIG. 5 is similar to FIG. 4, showing the results of simulation of diffraction efficiency at a position of the volume hologram 6 in Example 1 where reflection and diffraction take place at the angle of incidence of i=52.4° in the angle range of 50.6° to 54.6° at the hologram plane and the angle of reflection and diffraction of r=52.5°.

At a place of the volume hologram 6 in Example 1 where reflection and diffraction take place at the angle of incidence of i=52.4° in the angle range of 50.6° to 54.6° at the hologram plane and the angle of reflection and diffraction of r=52.5°, reentrance transmitted light is incident on the volume hologram 6 at −18.7°. From FIG. 5 it is seen that the reentrance transmitted light of 0.63 μm+20 μm wavelengths for red, of 0.525 μm±20 μm wavelengths for green and 0.47 μm±20 μm wavelengths for blue does not overlap the high-diffraction-efficiency area upon reentrance at an angle of incidence of −18.7; that is, it is transmitted as such.

FIG. 6 is similar to FIG. 4, showing the results of simulation of diffraction efficiency at a position of the volume hologram 6 in Example 1 where reflection and diffraction take place at the angle of incidence of i=54.6° in the angle range of 50.6° to 54.6° at the hologram plane and the angle of reflection and diffraction of r=54.7°.

At a place of the volume hologram 6 in Example 1 where reflection and diffraction take place at the angle of incidence of i=54.6° in the angle range of 50.6° to 54.6° at the hologram plane and the angle of reflection and diffraction of r=54.7°, reentrance transmitted light is incident on the volume hologram 6 at −18.2°. From FIG. 6 it is seen that the reentrance transmitted light of 0.63 μm±20 μm wavelengths for red, of 0.525 μm±20 μm wavelengths for green and 0.47 μm±20 μm wavelengths for blue does not overlap the high-diffraction-efficiency area upon reentrance at an angle of incidence of −18.2°; that is, it is transmitted as such.

In Example 1, the light beam from LCD5 or the light beam emerging from an object and passing through the aperture stop 14 transmits through the volume hologram 6. If, as shown in FIGS. 4 to 6, the volume hologram 6 is set in such a way that the red, green and blue transmitted light beams transmit through the high-diffraction-efficiency areas where the red band light, green band light and blue band light are each diffracted at a diffraction efficiency of 10% or greater, especially through an angle-of-incidence range in an area located on a shorter wavelength side than a region where the shortest wavelength blue band light is diffracted with high diffraction efficiency, it is then possible to concurrently reflect and diffract the red band light, green band light and blue band light incident at the angle of reflection and diffraction with high diffraction efficiencies, and concurrently transmit the red band light, green band light and blue band light incident at the angle of transmission with little or no diffraction. It is thus possible to achieve a hologram color beam slitter that can use light components having a plurality of wavelengths with ever higher efficiencies and present bright displays with satisfactory color reproducibility and a viewing or image pickup optical system for image display devices using such a hologram color beam splitter.

It is noted that the optical system of Example 1 has a focal length of 21.2 mm, an eye relief of 28.00 mm, a pupil diameter of φ4 mm and a working distance (WD) of 7.34 mm, and the image display element used has a diagonal length of 0.55 inch, an aspect ratio of 4:3 and a size of 8.448 mm×11.264 mm. The center diopter is −1.0D, and the viewing field angle is 30.0° for horizontal full-angle of view and 22.7° for vertical full-angle of view.

Set out below are the numerical data on Example 1. It is noted, however, that "FFS" is an abbreviation of free-form surface, "CYL" an abbreviation of cylindrical surface, "HOE" an abbreviation of reflection hologram plane, and "RE" an abbreviation of reflecting surface. Regarding the cylindrical surface, Rx and Ry stand for the radius of curvature of the surface in the X-axis direction and the radius of curvature of the surface in the Y-axis direction, respectively. It is further noted that Λ is the spacing between the periodical structures (interference fringes) of the refractive index distribution of the volume hologram in the hologram medium, Λs is the spacing between the periodical structures (interference fringes) of the refractive index distribution of the volume hologram at the surface of the hologram medium, and θ is the angle of tilt of the periodical structures (interference fringes) of the refractive index distribution of the volume hologram in the hologram medium with respect to the surface of the hologram medium.

EXAMPLE 1

| Surface No. | Radius of Curvature | Surface Displacement separation and tilt | Refractive index | Abbe's No. |
|---|---|---|---|---|
| Object plane | ∞ | −1000.00 | | |
| 1 | ∞ (Pupil) | | | |
| 2 | FFS① | (1) | 1.5254 | 56.2 |
| 3 | CYL① | (2) | 1.5254 | 56.2 |
| 4 | FFS② (RE) | (3) | 1.5254 | 56.2 |
| 5 | CYL① (HOE①) | (4) | 1.5254 | 56.2 |
| 6 | FFS③ | (5) | | |
| Image plane | ∞ | (6) | | |

CYL①

Rx −128.44
Ry ∞

FSS①

$C_4$ 6.4041 × $10^{-3}$   $C_6$ 2.4142 × $10^{-2}$   $C_8$ −7.2555 × $10^{-6}$
$C_{10}$ 2.7801 × $10^{-4}$   $C_{11}$ 4.9418 × $10^{-6}$   $C_{13}$ 4.5544 × $10^{-6}$
$C_{15}$ 9.4384 × $10^{-6}$,   $C_{17}$ −5.7579 × $10^{-7}$,   $C_{19}$ 1.1416 × $10^{-6}$
$C_{21}$ 3.1265 × $10^{-7}$

FSS②

$C_4$ −8.6139 × $10^{-3}$   $C_6$ −2.0278 × $10^{-3}$   $C_8$ 1.9774 × $10^{-5}$
$C_{10}$ 2.8876 × $10^{-5}$   $C_{11}$ 6.1298 × $10^{-7}$   $C_{13}$ −4.2136 × $10^{-7}$
$C_{15}$ 3.6073 × $10^{-6}$   $C_{17}$ −1.4625 × $10^{-7}$,   $C_{19}$ 3.6548 × $10^{-7}$
$C_{21}$ 2.7253 × $10^{-7}$

FSS③

$C_4$ 1.0827 × $10^{-3}$   $C_6$ −2.3537 × $10^{-2}$   $C_8$ −5.3117 × $10^{-4}$
$C_{10}$ −9.1443 × $10^{-4}$   $C_{11}$ −3.6029 × $10^{-5}$   $C_{13}$ 3.3466 × $10^{-4}$
$C_{15}$ 1.7611 × $10^{-4}$,   $C_{17}$ 3.5504 × $10^{-6}$,   $C_{19}$ −1.9995 × $10^{-5}$
$C_{21}$ −7.1100 × $10^{-6}$

HOE①

HV1 REA   HV2 REA   HOR 1
HX1 0.0   HY1 0.0   HZ1 0.0
HX2 0.0   HY2 0.0   HZ2 0.0
HWL: 630 nm
$H_2$ 4.7061 × $10^{-3}$   $H_3$ −7.1036 × $10^{-4}$   $H_5$ −7.1539 × $10^{-4}$
$H_7$ −4.1424 × $10^{-5}$   $H_9$ −1.0636 × $10^{-5}$   $H_{10}$ −5.1882 × $10^{-6}$
$H_{12}$ −8.2388 × $10^{-7}$   $H_{14}$ 2.3705 × $10^{-7}$   $H_{16}$ −2.2896 × $10^{-8}$
$H_{18}$ 9.3498 × $10^{-9}$   $H_{20}$ −9.7852 × $10^{-8}$   $H_{21}$ 2.6510 × $10^{-8}$
$H_{23}$ 5.2548 × $10^{-9}$   $H_{25}$ −5.8710 × $10^{-10}$   $H_{27}$ −3.7959 × $10^{-9}$

Displacement and tilt (1)

| X | 0.00 | Y | −0.96 | Z | 28.15 |
| α | 10.11 | β | 0.00 | γ | 0.00 |

Displacement and tilt (2)

| X | 0.00 | Y | 4.01 | Z | 31.31 |
| α | 20.09 | β | 0.00 | γ | 0.00 |

Displacement and tilt (3)

| X | 0.00 | Y | 0.55 | Z | 39.00 |
| α | −13.97 | β | 0.00 | γ | 0.00 |

Displacement and tilt (4)

| X | 0.00 | Y | 4.01 | Z | 31.31 |
| α | 20.09 | β | 0.00 | γ | 0.00 |

Displacements and tilt (5)

| X | 0.00 | Y | 14.11 | Z | 36.09 |
| α | 68.95 | β | 0.00 | γ | 0.00 |

Displacement and tilt (6)

| X | 0.00 | Y | 20.57 | Z | 36.32 |
| α | −111.29 | β | 0.00 | γ | 0.00 |

-continued

Hologram Data on Hologram for Red (630-nm Wavelength) Band Light in HOE①

| | Ray Coordinates (mm) | | Angle of Incidence (°) | | Angle of Emergence (°) | |
|---|---|---|---|---|---|---|
| Ray No. | X | Y | X | Y | X | Y |
| 1 | 0.000 | 1.357 | 0.000 | 50.608 | 0.000 | −50.769 |
| 2 | 0.000 | −8.268 | 0.000 | 52.659 | 0.000 | −53.436 |
| 3 | 8.319 | −8.478 | 12.547 | 53.819 | −13.487 | −54.564 |
| 4 | 7.533 | 1.159 | 10.722 | 50.697 | −11.716 | −50.823 |
| 5 | 6.822 | 9.892 | 11.376 | 49.642 | −12.264 | −48.546 |
| 6 | 0.000 | 10.418 | 0.000 | 50.053 | 0.000 | −48.830 |

| | Interference Fringes | | |
|---|---|---|---|
| Ray No. | Λ (μm) | Λs (μm) | θ (°) |
| 1 | 0.340 | 229.736 | 0.0846 |
| 2 | 0.360 | 50.430 | 0.4084 |
| 3 | 0.374 | 41.257 | 0.5195 |
| 4 | 0.343 | 38.257 | 0.5137 |
| 5 | 0.331 | 21.645 | 0.8761 |
| 6 | 0.330 | 29.966 | 0.6313 |

Hologram Data on Hologram for Green (525-nm Wavelength) Band Light in HOE①

| | Ray Coordinates (mm) | | Angle of Incidence (°) | | Angle of Emergence (°) | |
|---|---|---|---|---|---|---|
| Ray No. | X | Y | X | Y | X | Y |
| 1 | 0.000 | 1.367 | 0.000 | 50.625 | 0.000 | −50.756 |
| 2 | 0.000 | −8.240 | 0.000 | 52.740 | 0.000 | −53.378 |
| 3 | 8.309 | −8.453 | 12.641 | 53.903 | −13.415 | −54.516 |
| 4 | 7.517 | 1.170 | 10.790 | 50.717 | −11.605 | −50.820 |
| 5 | 6.806 | 9.857 | 11.424 | 49.589 | −12.154 | −48.695 |
| 6 | 0.000 | 10.379 | 0.000 | 50.000 | 0.000 | −49.003 |

| | Interference Fringes | | |
|---|---|---|---|
| Ray No. | Λ (μm) | Λs (μm) | θ (°) |
| 1 | 0.282 | 226.683 | 0.7129 |
| 2 | 0.299 | 50.750 | 0.3376 |
| 3 | 0.311 | 40.994 | 0.4353 |
| 4 | 0.285 | 34.456 | 0.4246 |
| 5 | 0.275 | 21.738 | 0.7249 |
| 6 | 0.274 | 30.091 | 0.5255 |

Hologram Data on Hologram for Blue (470-nm Wavelength) Band Light in HOE①

| | Ray Coordinates (mm) | | Angle of Incidence (°) | | Angle of Emergence (°) | |
|---|---|---|---|---|---|---|
| Ray No. | X | Y | X | Y | X | Y |
| 1 | 0.000 | 1.373 | 0.000 | 50.636 | 0.000 | −50.754 |
| 2 | 0.000 | −8.221 | 0.000 | 52.793 | 0.000 | −53.369 |
| 3 | 8.302 | −8.437 | 12.703 | 53.957 | −13.402 | −54.510 |
| 4 | 7.507 | 1.177 | 10.834 | 50.730 | −11.568 | −50.823 |
| 5 | 6.795 | 9.833 | 11.456 | 49.554 | −12.113 | −48.753 |
| 6 | 0.000 | 10.354 | 0.000 | 49.965 | 0.000 | −49.071 |

-continued

Hologram Data on Hologram for Blue (470-nm Wavelength) Band Light in HOE①

| | Interference Fringes | | |
|---|---|---|---|
| Ray No. | Λ (μm) | Λs (μm) | θ (°) |
| 1 | 0.256 | 235.813 | 0.0622 |
| 2 | 0.712 | 51.093 | 0.3048 |
| 3 | 0.283 | 41.438 | 0.3918 |
| 4 | 0.259 | 38.802 | 0.3821 |
| 5 | 0.250 | 21.925 | 0.6522 |
| 6 | 0.249 | 30.055 | 0.4748 |

Figure 2:
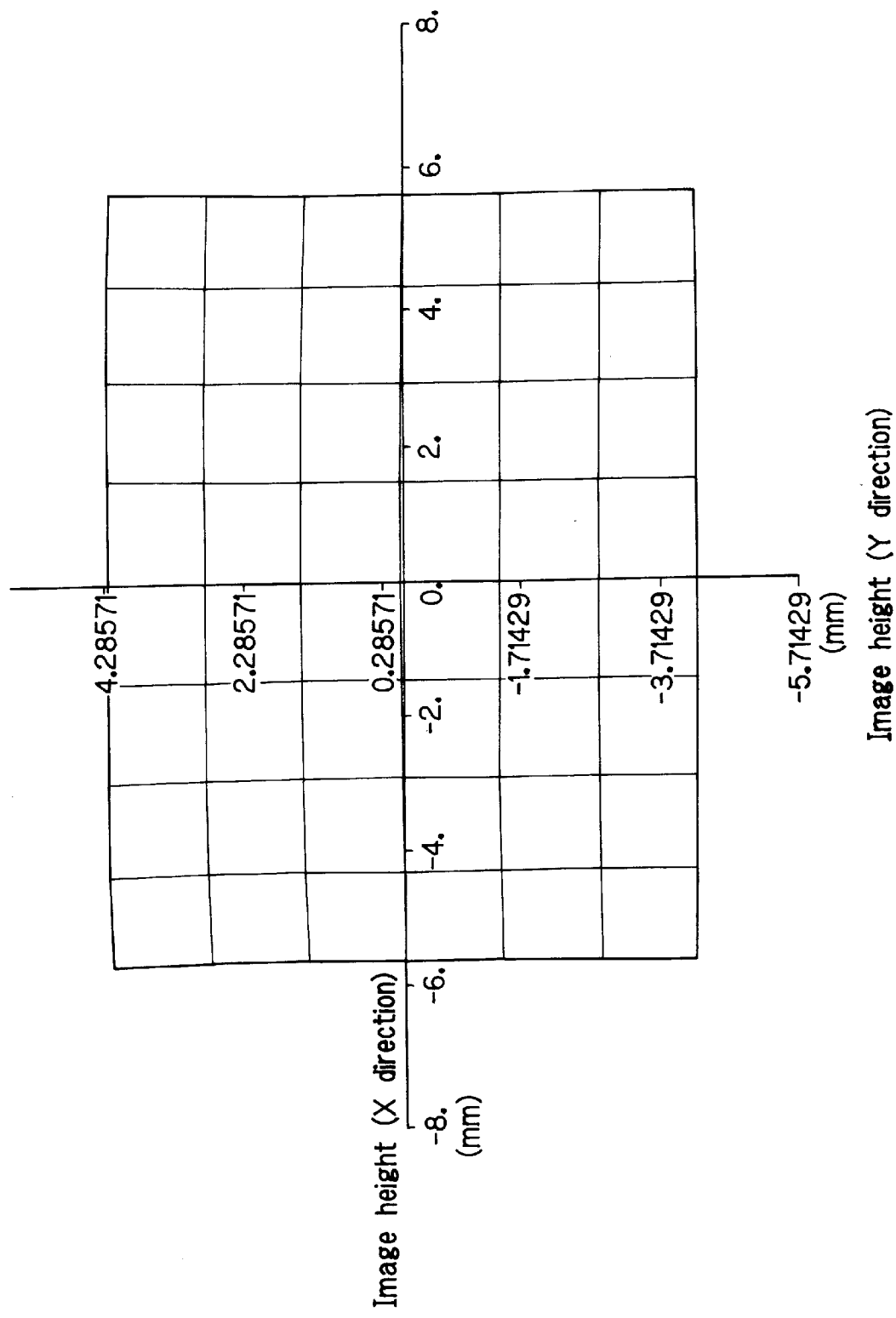
FIG. 2 is an aberration diagram illustrative of an image distortion in Example 1.
Figure 3:
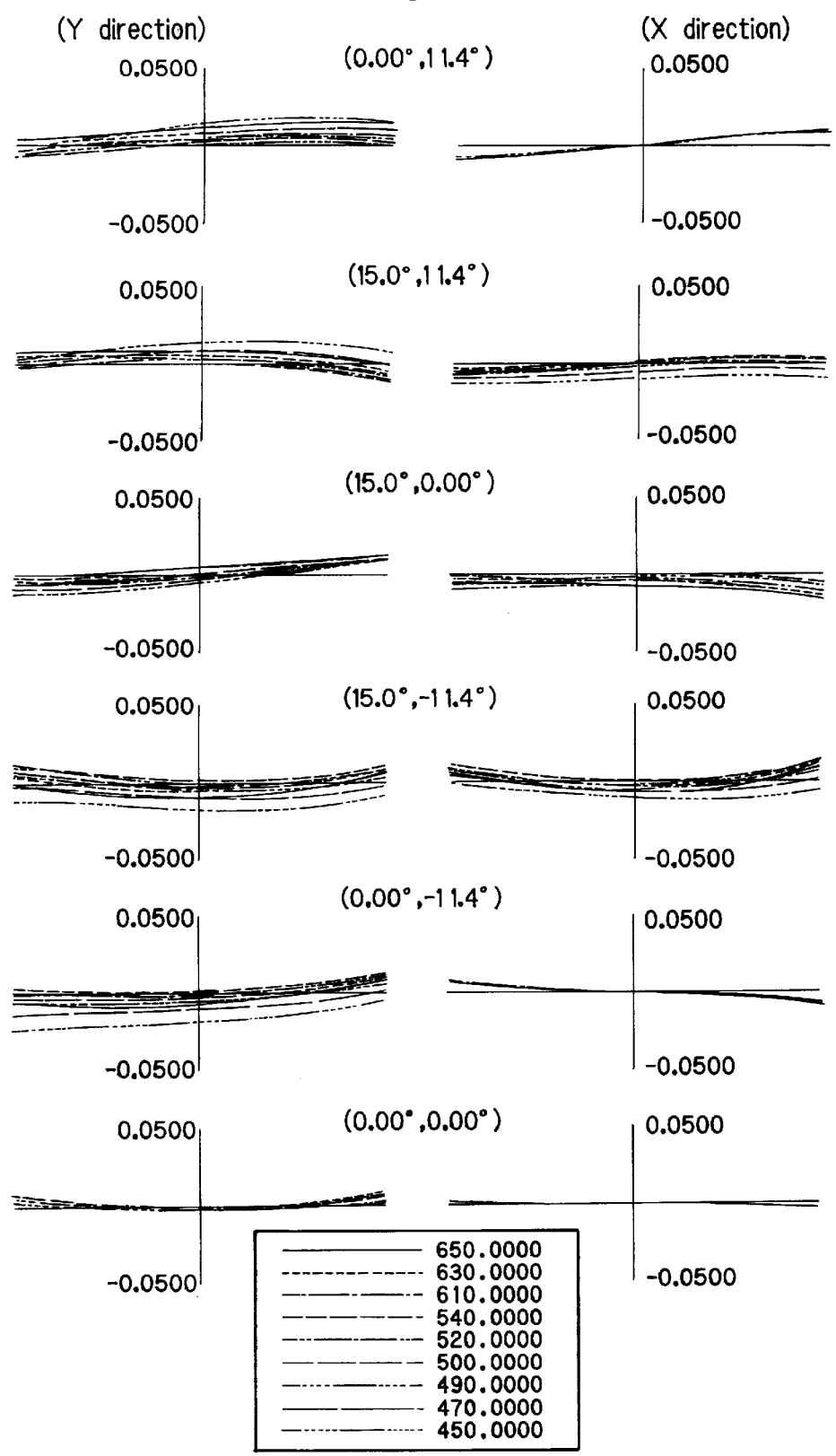
FIG. 3 is an aberration diagram illustrative of transverse aberrations in Example 1.

FIG. 2 is an aberration diagram indicative of image distortions in Example 1, and FIG. 3 is an aberration diagram indicative of transverse aberrations in Example 1. In the latter, the bracketed figures horizontal field angles and vertical field angles and transverse aberrations thereat are indicated.

It is noted that why the interference fringe spacings Λs, on the surface of the hologram medium, of the hologram for the red band light, green band light, and blue band light in the HOE① in the aforesaid tables are not perfectly identical with one another is that the ray coordinates vary slightly for each wavelength due to chromatic aberrations. When the coordinates on the surface of the hologram medium are identical with one another, the interference fringe spacings Λs, on the surface of the hologram medium, of the hologram for the red band light, green band light, and blue band light are equal to one another.

Figure 12:
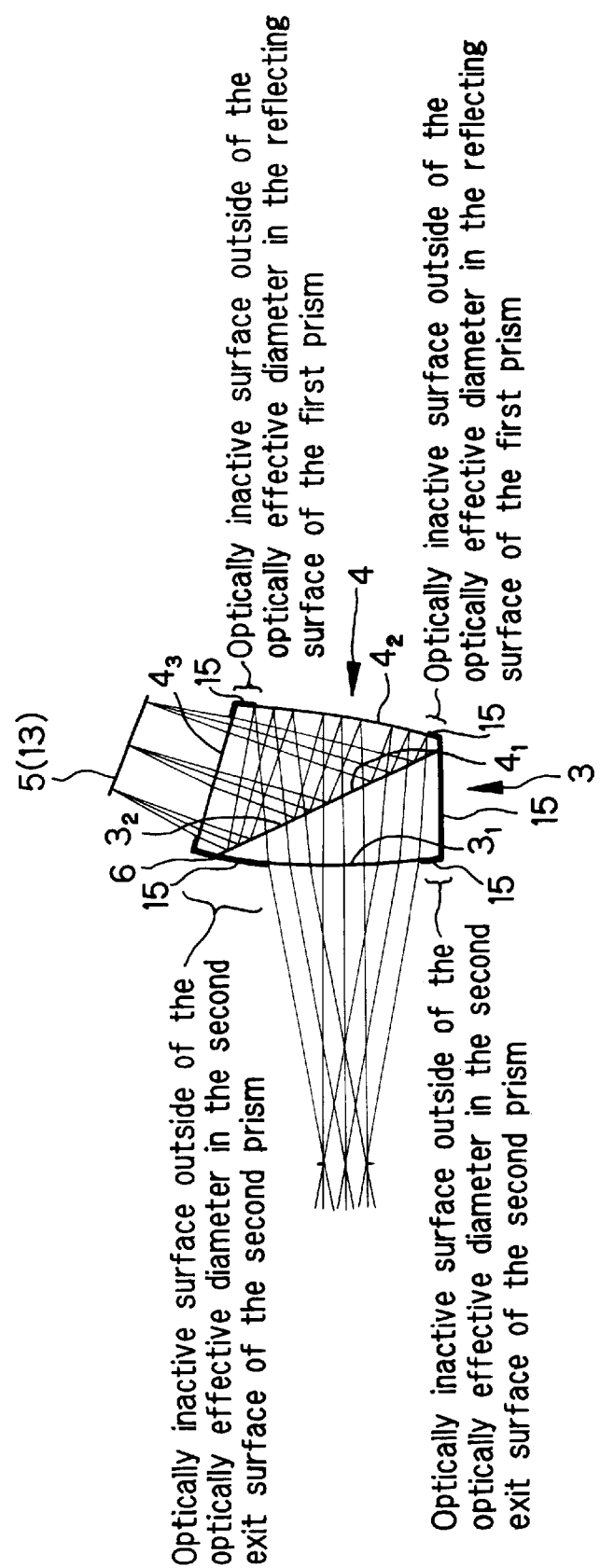
FIG. 12 is a Y-Z sectional schematic illustrative of a viewing optical system constructed using a ghost light removal member, including its optical axis.

In this connection, FIG. 12 is a Y-Z sectional view inclusive of the optical axis of the optical system of the present invention, showing that light transmitting the volume hologram 6 without diffraction takes the form of ghost light producing unsatisfactory influences.

Even when a light beam is incident at a given angle of incidence on the volume hologram 6 in the above-exemplified arrangement, light rays in the given wavelength region are not subjected to 100% diffraction and reflection. In other words, only slight a portion of the light beam is not diffracted and reflected, producing unnecessary transmitted light.

Figure 13:
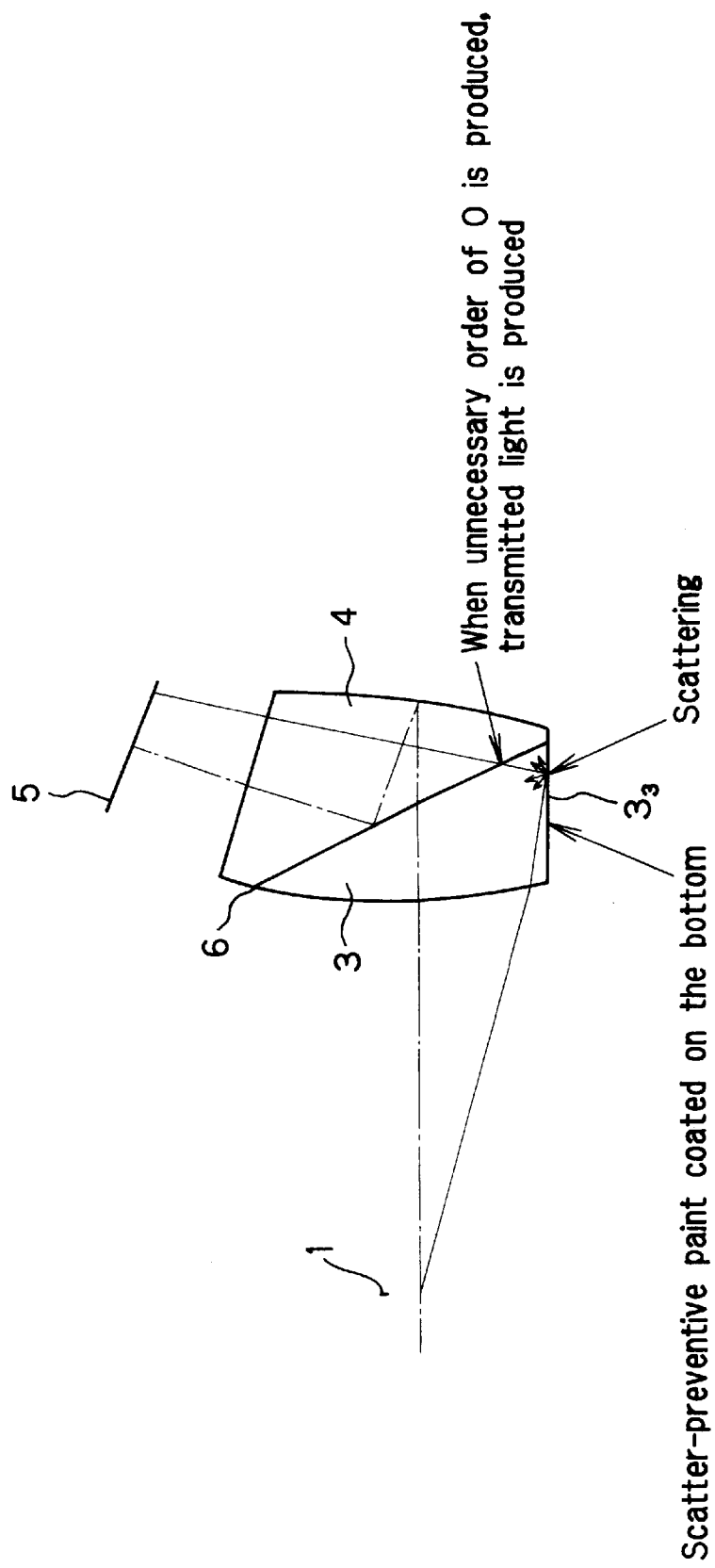
FIG. 13 is illustrative of why light that transmits the volume hologram without being diffracted has adverse influences in the form of ghost light.

For instance, if that transmitted light strikes on the bottom $3_3$ or side (vertical to the paper) of the eyepiece optical system shown in FIG. 13, then the reflected light may possibly be entered into the eyeball of the viewer in the form of ghost light.

To avoid this, an arrangement wherein the side or bottom $3_3$ of the first prism 3 or the side of the second prism 4 is painted or otherwise provided with a black coating material capable of absorbing light or the like to form a ghost light removal member is added to the arrangement of FIG. 1, as shown in FIG. 12. It is then preferable that the ghost light removal member 15 is also provided at areas included in optically inactive surfaces (other than the optically active surfaces of the first prism 3 and the second prism 4, at which light beams are transmitted or reflected) outside of the effective ray diameter within the second exit surface $4_3$ of the second prism 4, the effective ray diameter within the reflecting surface $4_2$ of the second prism, and the effective ray diameter within the first entrance surface $3_1$ of the first prism 3.

The aforesaid viewing optical system and image pickup optical system of the present invention may be used as a viewing system for viewing object images through an eyepiece lens or a phototaking system for forming object images and receiving the object images at an image pickup element such as a CCD or silver salt film for phototaking. For instance, the present invention may be applied to microscopes, head-mounted image display devices, endoscopes, projectors, silver salt cameras, digital cameras, VRT cameras, information processors such as personal computers or cellular phones with built-in phototaking devices, as exemplified below.

Figure 14:
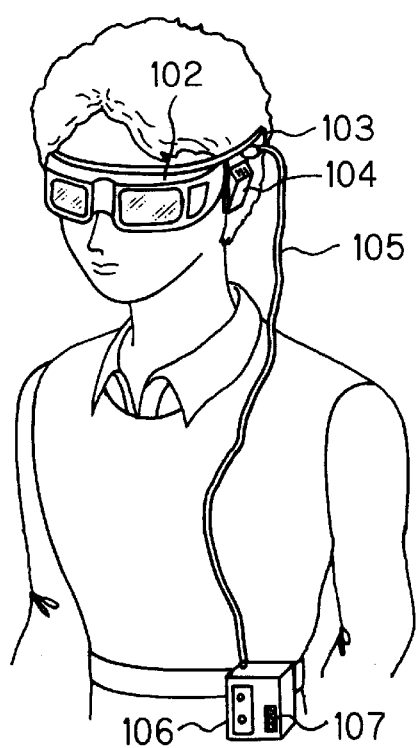
FIG. 14 is illustrative of a head-mounted goggles type image display device using the observation optical system according to the present invention, which is mounted over the head of an observer.
Figure 15:
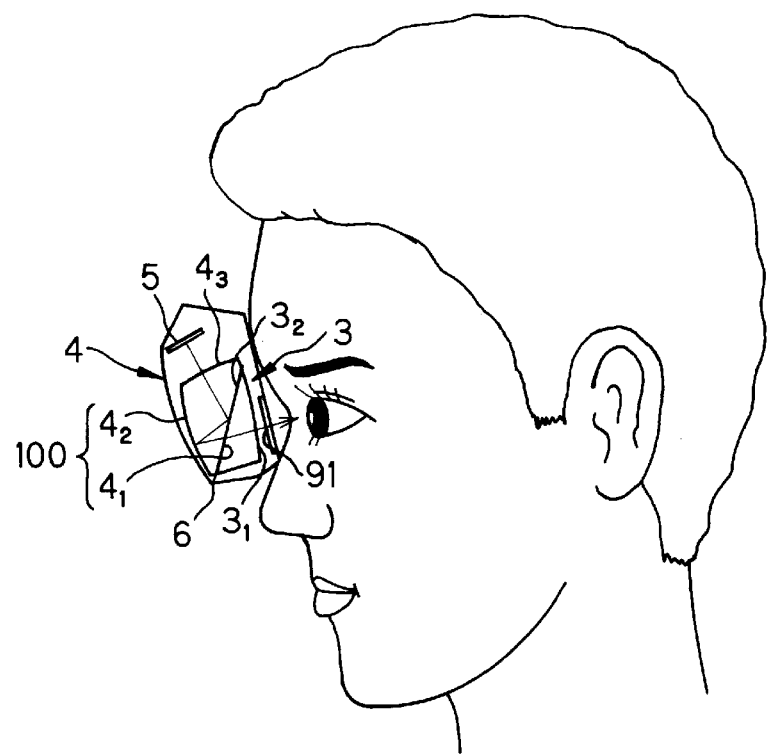
FIG. 15 is a sectional view taken on a section of FIG. 14.
Figure 16:
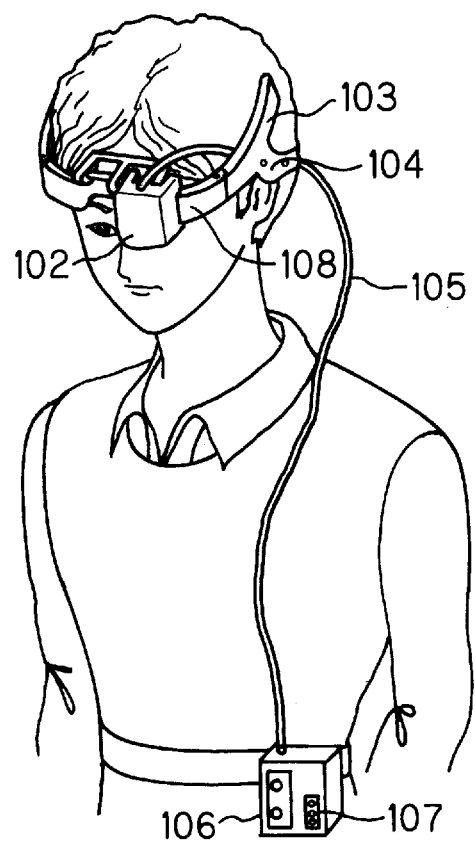
FIG. 16 is illustrative of a head-mounted monocle type image display device using the observation optical system according to the present invention, which is mounted over the head of an observer.

As an example, FIG. 14 is illustrative of a head-mounted goggles type image display device, which is mounted over the head of a viewer, and FIG. 15 is a sectional view of that device. In this embodiment, the viewing optical system according to the present invention is used as an eyepiece optical system 100 comprising an image display element 5, as shown in FIG. 16. A pair of such eyepiece optical systems 100 are supported at an interpupillary distance to make up a portable image display device 102 that enables images to be viewed with both eyes, for instance, an installable or head-mounted type image display device.

More specifically in the image display device proper 102, a pair of such viewing optical system as described above are used as eyepiece optical systems 100 and optical display elements 5, each comprising a liquid crystal display element, are provided in association therewith. The image display device proper 102 is provided with a continuously extending temple frame 103, as shown in FIG. 14, thereby holding the image display device proper 102 in front of the eyes of the viewer. As shown in FIG. 15, a cover member 91 is interposed between the exit pupil of each eyepiece optical system 100 and the first entrance surface $3_1$ of the first prism. For this cover member 91, any one of a plane-parallel plate, a positive lens and a negative lens may be used.

Additionally, a speaker 104 is added to the temple frame 103 so that stereophonic sound can be heard simultaneously with observation of images. Thus, the display device body 102 having the speaker 104 is connected with a playback 104 such as a portable video cassette via an image/sound transmission cord 105, so that the viewer can enjoy images and sounds while holding this playback 106 at any desired position of a belt or the like, as shown in FIG. 14. In FIG. 14, reference numeral 107 stands for a control portion on the playback 106, which portion comprises a switch, a volume or the like. It is here noted that the image display device body 102 has built-in electronic parts for image, sound and other processing.

It is noted that the cord 105 may be provided with a jack for insertion into an existing video deck. In addition, the cord may be connected to a tuner for reception of TV waves to watch the television or to a computer to receive computer graphics images, computer-generated message images, etc. To eliminate awkward cords, an antenna may be additionally attached to the image display device proper for reception of signals from outside via waves.

Furthermore, the viewing optical system of the present invention may be applied to a head-mounted monocle type image display device wherein an eyepiece optical system is disposed in front of either one of both eyes. FIG. 16 is illustrative of such a monocle type image display device mounted over the head of a viewer (e.g., the left eye in this embodiment). In this arrangement, a image display device body 102 comprising a set of eyepiece optical system including an image display element 5 is mounted at a position of a front frame 108 in front of the associated eye, and the front frame 108 is provided with a continuously extending frame 103, so that the display device body 102 can be held in front of each eye of a viewer. The arrangement is otherwise the same as in FIG. 14, and so is not explained.

Figure 17:
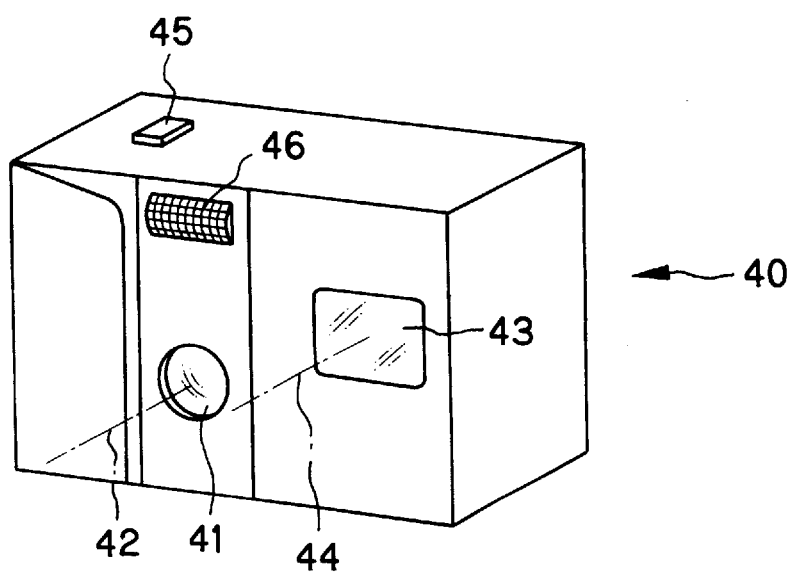
FIG. 17 is a front perspective view illustrative of the outside shape of an electronic camera to which the image pickup optical system and viewing optical system according to the present invention are applied.
Figure 18:
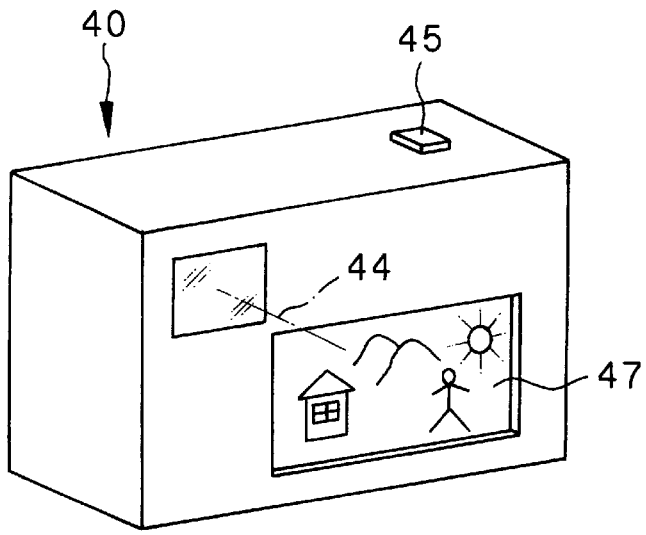
FIG. 18 is a rear perspective view illustrative of the electronic camera of FIG. 17.
Figure 19:
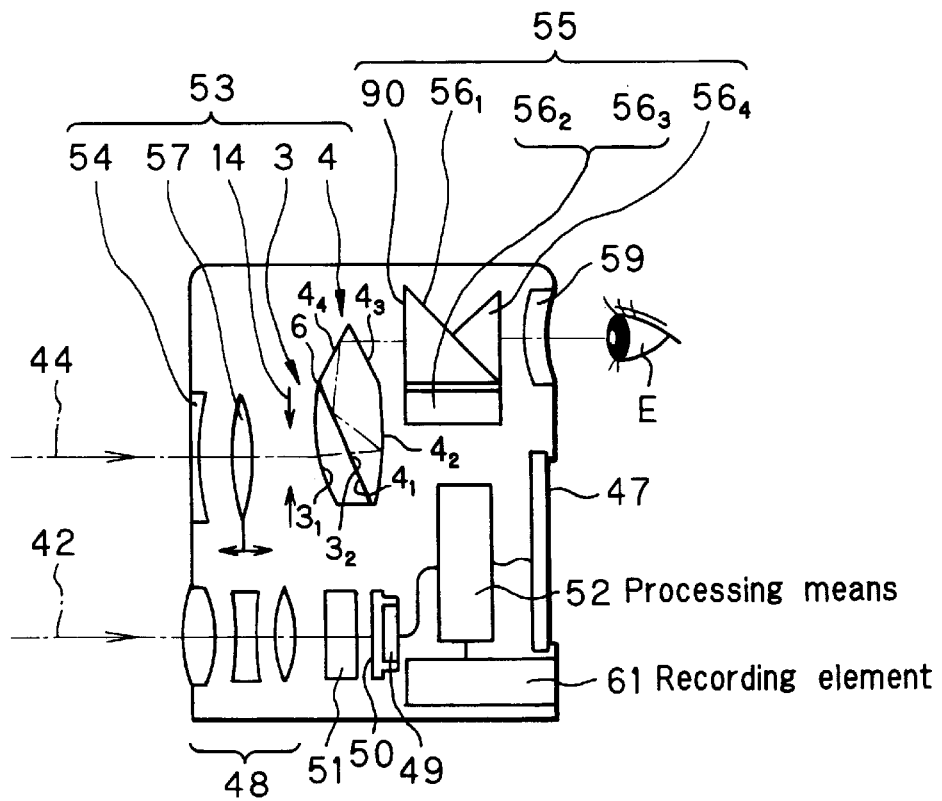
FIG. 19 is a sectional view illustrative of one construction of the electronic camera of FIG. 17.

FIGS. 17, 18 and 19 are conceptual illustrations of the objective optical system of a finder portion in an electronic camera, in which part of the image pickup optical system according to the present invention is incorporated. FIG. 17 is a front perspective view of the outside shape of an electronic camera 40, and FIG. 18 is a rear perspective view of the same. FIG. 19 is a sectional view of the construction of the electronic camera 40.

In this embodiment, the electronic camera 40 comprises a phototaking optical system 41 including a phototaking optical path 42, a finder optical system 43 including a finder optical path 44, a shutter button 45, a flash 46, a liquid crystal monitor 47 and so on. As the shutter button 45 mounted on the upper portion of the camera 40 is pressed down, phototaking occurs through a phototaking objective optical system 48. An object image formed by the phototaking objective optical system 48 is formed on the image pickup plane 50 of a CCD 49 via a filter 51 such as an optical low-pass filter F or an infrared cut filter.

The object image received at CCD 49 is displayed as an electronic image on the liquid crystal monitor 47 via processing means 52, which monitor is mounted on the back of the camera. This processing means 52 is connected with recording means 61 in which the phototaken electronic image may be recorded. It is here noted that the recording means 61 may be provided separately from the processing means 52 or, alternatively, it may be constructed in such a way that images are electronically recorded and written therein by means of floppy disks or the like. This camera may also be constructed in the form of a silver salt camera using a silver salt film in place of CCD 49.

Moreover, a finder objective optical system 53 is located on the finder optical path 44. This finder objective optical system 53 comprises a cover lens 54, a positive lens group 57 whose position is adjustable for focusing in the optical axis direction, an aperture stop 14, a first prism 3 and a second prism 4. The cover lens 54 used as a cover member is a lens group having negative power, and functions to enlarge the angle of view. It is here noted that the second prism 4 is constructed as described in Example 1 of the present invention, and further comprises a reflecting surface $4_4$ on an optical path from a hologram 6 provided on a second entrance surface $4_1$ to a second exit surface $4_3$, which optical path is taken by diffracted and reflected light from the hologram 6. An object image formed by the finder objective optical path 53 on an image formation plane is in turn formed on the field frame of a Porro prism 55 that is an image erecting member.

It is here noted that the field frame is disposed between the first reflecting surface $56_1$ and the second reflecting surface $56_2$ of the Porro prism 55 to separate them, and comprises the first reflecting surface $56_1$ to the fourth reflecting surface $56_4$. In the rear of the Porro prism 55 there is located an eyepiece optical system 59 for guiding an erected image into the eyeball E of an observer.

With the thus constructed digital camera 40, it is possible to achieve high performance and cost reductions, because the finder objective optical system 53 is constructed of a reduced number of optical members. In addition, the optical path through the objective optical system 53 is by itself turned back; there is an increase in the degree of freedom in locating the optical path in the camera, which is favorable in consideration of design.

While no reference has been made to the construction of the phototaking objective optical system 48 in the arrangement of FIG. 19, it is understood that, instead of the refracting type coaxial optical system, any one of the image pickup optical systems comprising two such prisms 3 and 4 as shown in Example 1 of the present invention may be used as the phototaking objective optical system 48.

It is also understood that the eyepiece optical system 59 may be constructed using any one of the eyepiece optical members comprising two such prisms 3 and 4 as described in Example 1 of the present invention.

Figure 20:
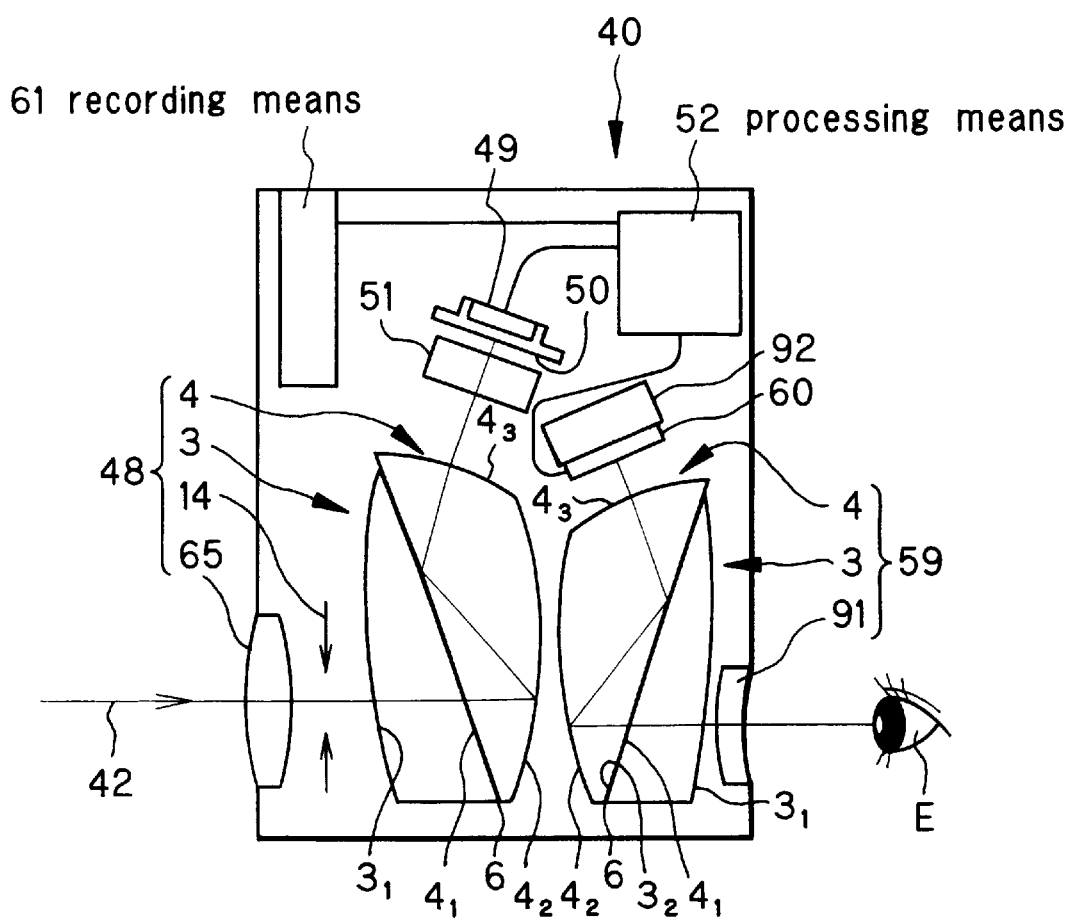
FIG. 20 is a conceptual rendering illustrative of another electronic camera to which the image pickup optical system and viewing optical system according to the present invention are applied.

FIG. 20 is a conceptual illustration of an embodiment wherein the image pickup optical system of the present invention is incorporated in the objective optical system 48 of a phototaking portion in the electronic camera 40 and the viewing optical system of the present invention is incorporated in the eyepiece optical system 59 in the electronic camera 40. In this embodiment, the phototaking objective optical system 48 disposed on a phototaking optical path 42 comprises a cover member 45 comprising a positive lens and any one of the image pickup optical systems comprising two such prisms 3 and 4 as described in Example 1 of the present invention. A filter 51 such as a low-pass filter or infrared cut filter is interposed between the second prism 4 and a CCD 49. An object image formed by this phototaking objective optical system 48 is formed on the image pickup plane 50 of CCD 49. The object image received at this CCD 49 is displayed as an electronic image on a liquid crystal display element (LCD) 60 via processing means 52. This processing means 52 also controls recording means 61 for recording the electronic image phototaken by CCD 49 as electronic information. The image displayed on LCD 60 is guided to the eyeball E of the viewer via an eyepiece optical system 59.

This eyepiece optical system 59 is made up of decentered prism optical systems 3 and 4 in a form similar to that of such a viewing optical system as set forth in Example 1 of the present invention and a cover lens 9 located on the exit pupil side thereof. In the back of LCD 60 there is located a backlight 92 for illuminating LCD 60. It is noted that this phototaking objective optical system 48 may further comprise other lenses (a negative and a positive lens) on the object or image side of the two prisms 3 and 4.

With the thus constructed camera 40, it is possible to achieve high performance and cost reductions because the phototaking objective optical system 48, and the eyepiece optical system 59 can be composed of a reduced number of optical members. In addition, the optical systems can be generally arranged on the same plane, and so the thickness of the camera 40 can be reduced in the direction to that plane.

While the positive lens is disposed as the cover member 64 for the phototaking objective optical system 48 in this example, it is understood that a negative lens or a plane-parallel plate may instead be used.

Such a cover member is not always necessary. For instance, the surface located nearest to the object side of the image pickup optical system of the present invention may be used as a combined cover member. In this case, that surface located nearest to the object side is defined by the first entrance surface $3_1$ of the first prism 3. However, it is noted that the entrance surface $3_1$ is decentered with respect to the optical axis, and so the location of this surface in front of the camera creates an illusion of a misalignment with the center of the camera 40 for the user, as viewed from the subject side (as is the case with a general camera, the user is usually positioned in the direction vertical to the entrance surface), giving uncomfortableness to the user. Accordingly, when the surface of the image-formation optical system located nearest the object side is decentered as in the present invention, it is preferable to provide the cover member 65 (or the cover lens 54), because the user can phototake images in much the same way as in existing cameras with no trouble as viewed from the subject side.

Figure 21A:
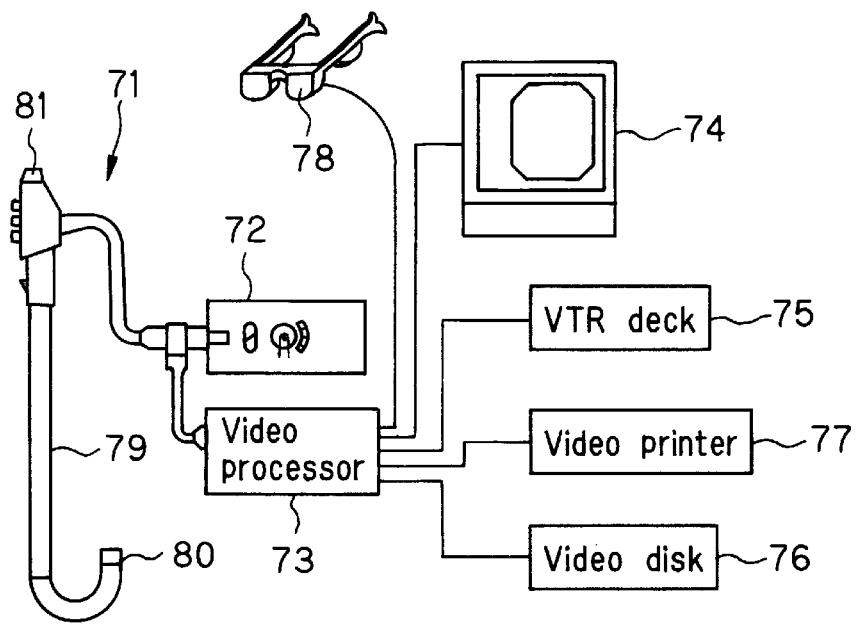
FIG. 21 is a conceptual rendering illustrative of an electronic endoscope to which the image pickup optical system and viewing optical system according to the present invention are applied.
Figure 21B:
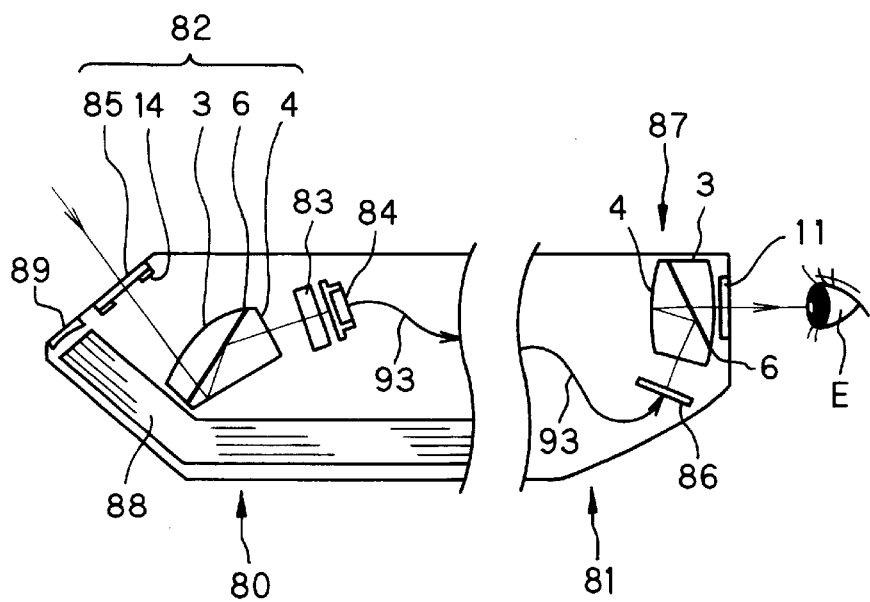

FIG. 21 is a conceptual rendering of an embodiment wherein the image pickup optical system of the present invention is built in an objective optical system 82 in the viewing arrangement of an electronic endoscope, and the viewing optical system of the present invention is incorporated in an eyepiece optical system 87 of the viewing arrangement of the electronic endoscope. The objective optical system 82 of the viewing system and the eyepiece optical system 87 used herein are each substantially similar in construction as in Example 1. As shown in FIG. 21(*a*), this electronic endoscope arrangement comprises an electronic endscope 71, a light source unit 72 for supplying illumination light, a video processor 73 for performing signal processing corresponding to the electronic endoscope 71, a monitor 74 for displaying image signals produced from the video processor 73, a VTR deck 75 and a video disk 76 connected to the video processor 73 for recording image signals, etc., a video printer 77 for printing out image signals in the form of images and a head-mounted image display device (HMD) 78 such as one shown in FIG. 14. A leading end 80 of an insert 79 of the electronic endscope 71 and its eyepiece unit 81 are constructed as shown in FIG. 21(*b*).

A light beam leaving the light source unit 72 passes through a light guide fiber bundle 88 to illuminate a site under observation via an illumination objective optical system 89. Light from this site under observation passes through the cover member 85 and arrives at the viewing objective optical system 82 at which it is formed as an object image. Passing through a filter 83 such as a low-pass filter or infrared cut filter, this object image is formed on the image pickup plane of a CCD 84. Then, this object image is converted to image signals by CCD 84, which are in turn displayed directly on the monitor 74 via the video processor 73 shown in FIG. 21(*a*) and recorded in the VTR deck 75 and video disk 76 or printed out by the video printer 77 in the form of images. The image is also displayed on an image display element 5 (FIG. 15) of HMD 78 so that the wearer can view it. At the same time, the image signals converted by CCD 84 is displayed as an electronic image on a liquid crystal display element (LCD) 86 of the eyepiece portion 81 via image signal transmission means 93. The displayed image is guided to the eyeball E of the observer via the eyepiece optical system comprising the viewing optical system of the present invention.

With the thus constructed endoscope composed of a reduced number of optical members, it is possible to achieve high performance and cost reductions. In addition, the objective optical system 80 is positioned in the longitudinal direction of the endoscope, and so the aforesaid effect is achievable while the diameter of the endoscope is reduced.

Figure 22:
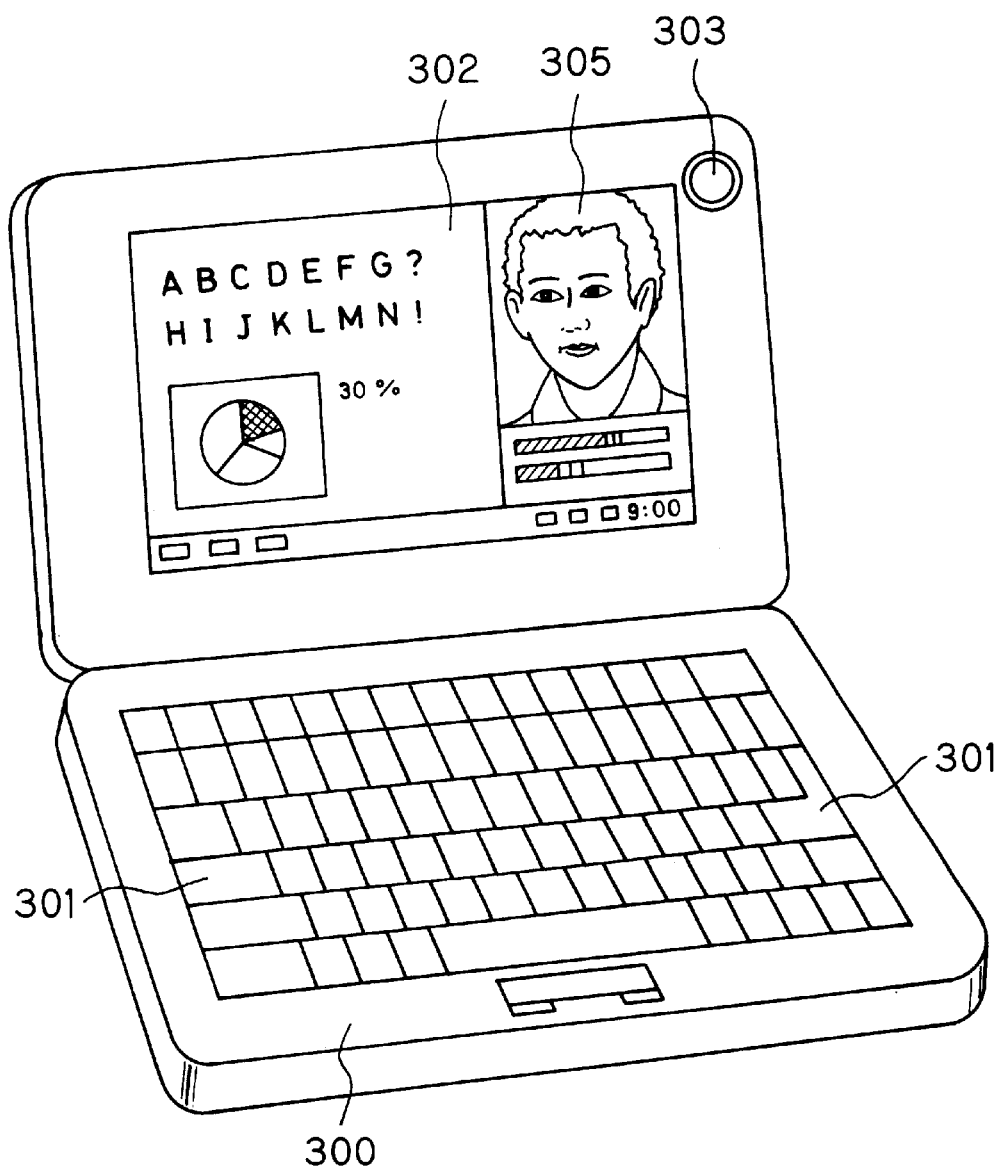
FIG. 22 is a front perspective view illustrative of an uncovered personal computer in which the image pickup optical system of the present invention is built in as an objective optical system.
Figure 23:
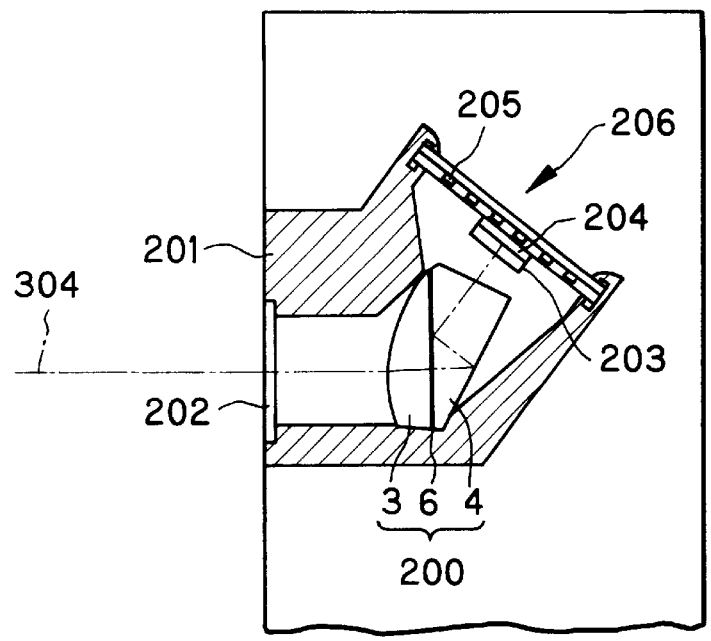
FIG. 23 is a sectional view illustrative of a phototaking optical system in the personal computer.
Figure 24:
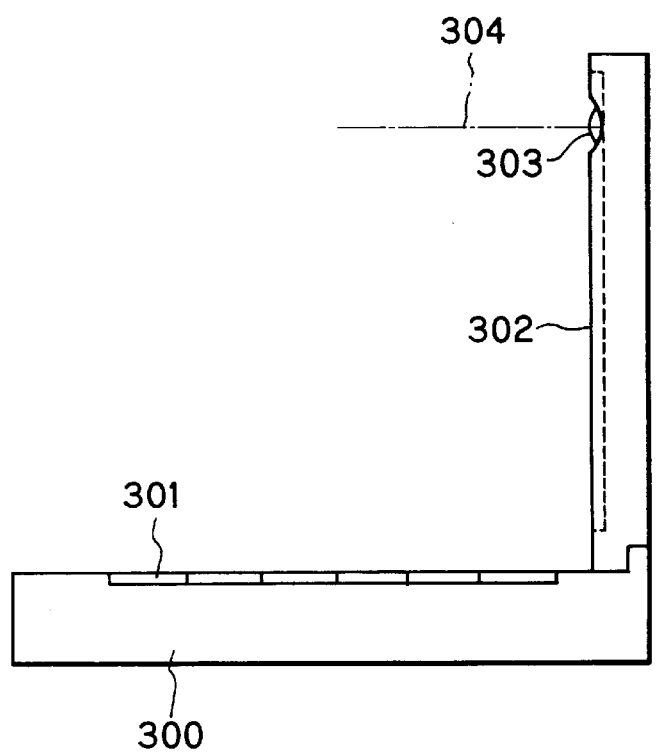
FIG. 24 is a side view of the state shown in FIG. 22.

FIGS. 22, 23 and 24 illustrate a personal computer that is one embodiment of information processors in which the image pickup optical system of the present invention is built.

FIG. 22 is a front perspective view of a personal computer or PC 300 in an uncovered state, FIG. 23 is a sectional view of a phototaking optical system 303 in PC 300, and FIG. 24 is a side view of FIG. 22. As shown in FIGS. 22 to 24, PC 300 comprises a keyboard 301 for allowing an operator to enter information therein from outside, information processing and recording means (not illustrated), a monitor 302 for displaying the information to the operator, and a phototaking optical system 303 for phototaking an image of the operator per se and nearby images. The monitor 302 used herein may be a transmission type liquid crystal display illuminated from its back side by means of a backlight (not shown), a reflection type liquid crystal display designed to reflect light from its front side for display purposes, a CRT display or the like. As shown, the phototaking optical system 303 is built in the right upper portion of the monitor 302; however, it may be located at any desired position, for instance, around the monitor 302 or the keyboard 301.

This phototaking optical system 303 comprises an objective optical system 200 comprising the image pickup optical system of the present invention, a phototaking optical path 304 on which the system 200 is located, and an image pickup chip 204 for receiving images. The members are built in PC 300.

In this embodiment, an IR cut filter 203 is additionally applied onto the image pickup chip 204 to form a one-piece image pickup unit 206 that can be mounted at the rear end of the lens barrel 201 of the objective optical system 200 in one-touch snap operation. Thus, any centering or intersurface adjustment for the objective optical system 200 and image pickup chip 204 can be dispensed with, and so smooth assembly is achieved. Further, the lens barrel 201 is provided at the other end with a cover glass 202 for protection of the objective optical system 200.

An object image received at the image pickup chip 204 is entered into the processing means of PC 300 via a terminal 205 and displayed as an electronic image on the monitor 302. As an example, an image 305 phototaken of the operator is shown in FIG. 22. The image 305 may be displayed on a personal computer on the other end of the line by way of processing means and the Internet or a telephone.

FIG. 25 is illustrative of a convenient-to-carry cellular phone that is one exemplary information processor in which the image pickup optical system of the present invention is built.

Figure 25A:
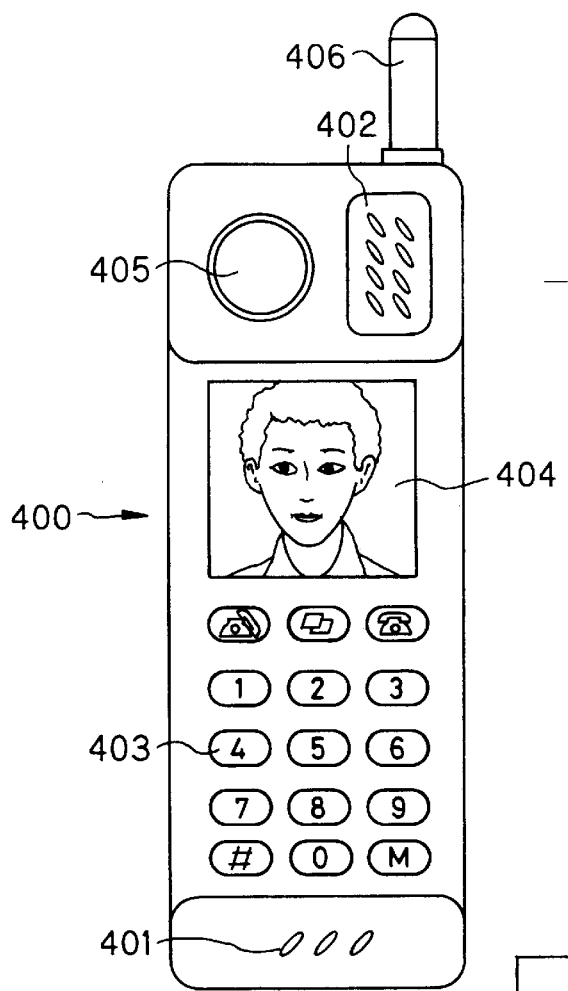
FIGS. 25(a), 25(b) and 25(c) are a front and a side view of a cellular phone in which the phototaking optical system of the present invention is built in as an objective optical system, and a sectional view of that phototaking optical system, respectively.
Figure 25B:
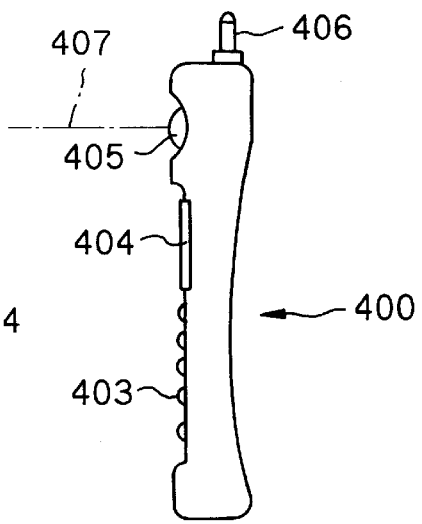
Figure 25C:
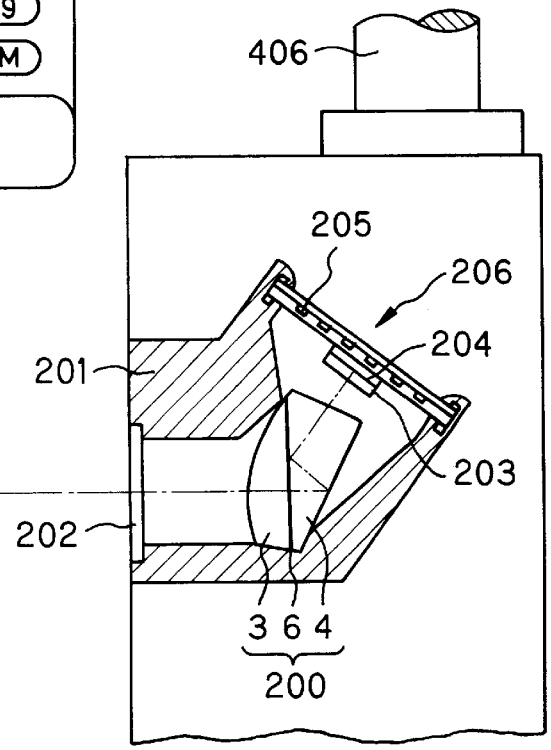

FIGS. 25(a) and 25(b) are a front view and a side view of a cellular phone 400, and FIG. 25(c) is a sectional view of a phototaking optical system 405. As shown, the cellular phone 400 comprises a microphone 401 through which the voice of an operator is entered as information, a speaker 402 through which the voice of a person on the other end of the like is produced, an input dial 403 through which the information is entered by the operator, a monitor 404 for displaying images phototaken of the operator per se, the person on the other end of the line and so on as well as information such as telephone numbers, a phototaking optical system 405, an antenna 406 for transmission and reception of radio waves for communications, and processing means (not shown) for processing image information, communications information, input signals, etc. Here a liquid crystal display is used for the monitor 404. How the respective devices are arranged is not particularly limited to the arrangement shown in FIG. 25. This phototaking optical system 405 comprises an image pickup optical system 200 of the present invention mounted on a phototaking optical path 407 and an image pickup chip 204 for receiving images, which are built in the cellular phone 400.

In this embodiment, an IR cut filter 203 is additionally applied onto the image pickup chip 204 to form a one-piece image pickup unit 206 that can be mounted at the rear end of the lens barrel 201 of the objective optical system 200 in one-touch snap operation. Thus, any centering or intersurface adjustment for the objective optical system 200 and image pickup chip 204 can be dispensed with, and so smooth assembly is achieved. Further, the lens barrel 201 is provided at the other end with a cover glass 202 for protection of the objective optical system 200.

An object image received at the image pickup chip 204 is entered into processing means (not shown) via a terminal 205, so that the image is displayed as an electronic image on the monitor 404 and/or a monitor on the other end of the line. To transmit the image to the person on the other end, the signal processing means has a signal processing function of converting information on the object image received at the image pickup chip 204 to transmittable signals.

Figure 26:
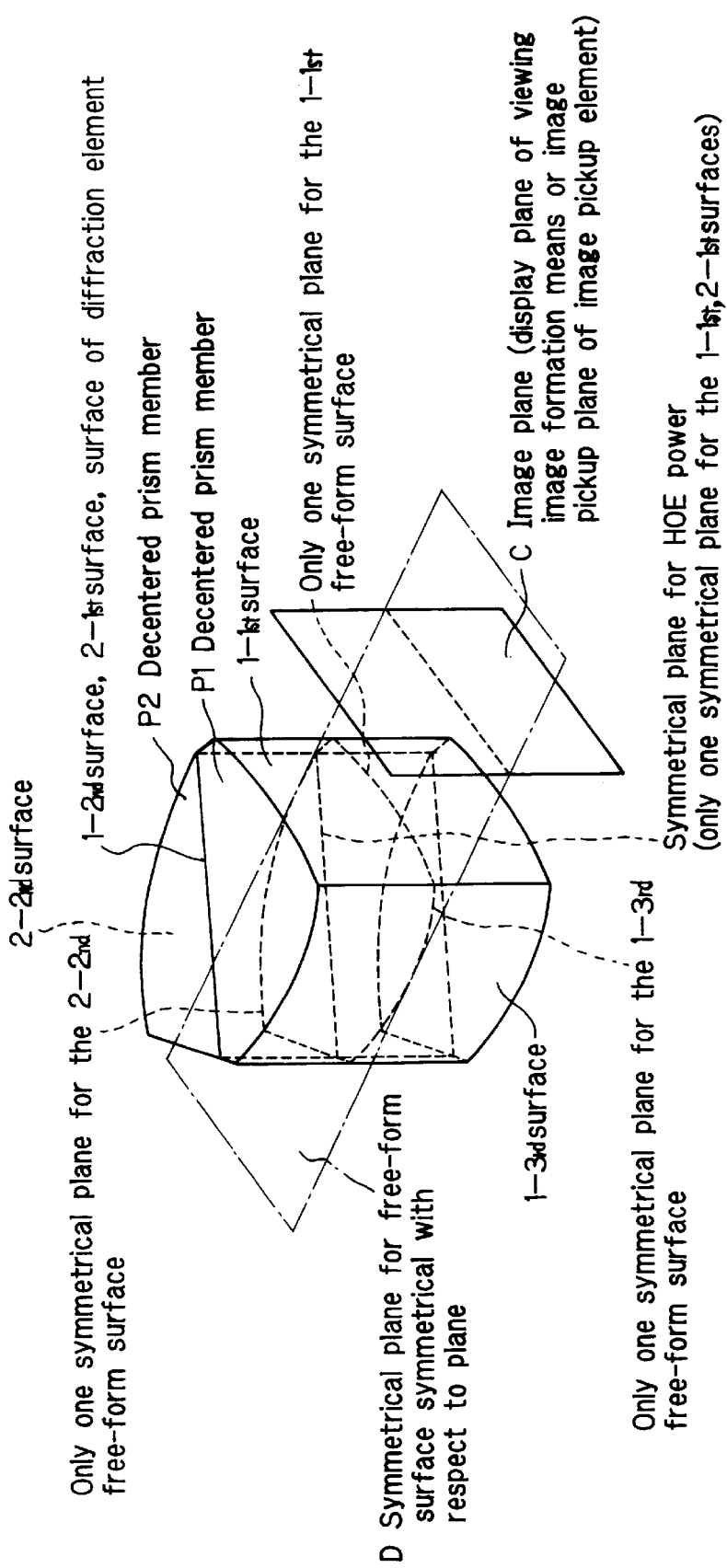
FIG. 26 is illustrative of one preferable construction of how the HOE is located with respect to the prism forming part of the optical system of the present invention.
Figure 27A:
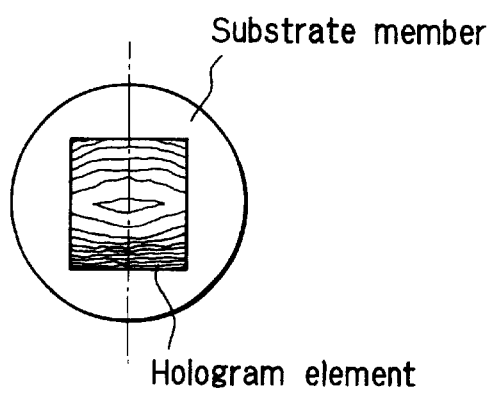
FIGS. 27(a) and 27(b) are a front and a side view illustrative of two powers in the case where a hologram element is provided on a spherical substrate member.
Figure 27B:
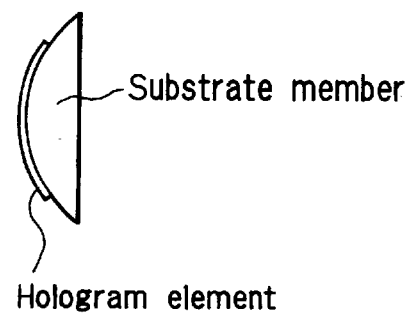

FIG. 26 is illustrative of one preferable arrangement wherein a diffraction element such as a volume hologram is mounted on a prism forming the optical system of the present invention. In FIG. 26, decentered prisms P1 and P2 are the second prism 4 and first prism 3 included in the optical system of the present invention, respectively. Here assume that an image plane C (e.g., the display plane of the image display element 5 or the image pickup plane of the image pickup element 13) is of such a rectangular shape as shown in FIG. 27. Then, it is preferable for the formation of beautiful images that a symmetrical plane D for the 1-1st surface of the decentered prism P1 (the second exit surface $4_3$ of the second prism 4) or the 2-2nd surface of the decentered prism P2 (the first entrance surface $3_1$ of the second prism 4), which is in the form of a free-form surface symmetrical with respect to plane, is parallel with at least one of four sides that form this image place C.

Furthermore, when the image plane C is configured in the form of a square or rectangle having four internal angles of approximately 90°, it is preferable that the symmetrical plane D for the free-form surface symmetrical with respect to plane is parallel with two sides of the image plane C, which sides are parallel with each other, and the symmetrical plane D is brought in coincidence with the position at which the image plane C is symmetrical with respect to the horizontal or vertical. With this arrangement, the prism can be incorporated in the optical system with high precision, and so the optical system is effective for mass production.

When some or all of the 1-1st surface (the second exit surface $4_3$ of the second prism 4), the 1-2nd surface (the second entrance surface $4_1$ of the second prism 4), the 1-3rd surface (the reflecting surface $4_2$ of the second prism 4), the 2-1st surface (the first exit surface $3_2$ of the first prism 3), the 2-2nd surface (the first entrance surface $3_1$ of the first prism 3), etc. that are optical surfaces forming the decentered prisms P1 and P2 are configured in the form of free-form surfaces symmetrical with respect to plane, symmetrical planes for them should preferably be disposed on the same plane D in view of both design and aberration performance. Then, the symmetrical plane D and the power plane of the diffraction element 6 should have the same relations as explained above.

While the optical system of the present invention and devices using the same have been explained with reference to many embodiments, it is understood that the present invention is not limited to such embodiments and so many modifications may be possible.

The two-dimensional image display element disposed at the image plane 5 to form a two-dimensional image display element in the optical system of the present invention is not limited to LCDs. For instance, PDPs, DMDs and organic ELs may be used. One-dimensional images formed by a one-dimensional array of LCDs, PDPs, DMDs, organic ELs, LEDs or the like may be displayed by scanning with galvanomirrors or polygonal mirrors or, alternatively, images may be displayed by two-dimensional scanning of point light sources such as LEDs.

The volume hologram element used herein may be of the multilayer type wherein volume holograms recorded at various wavelengths are stacked one upon another or the multiple recorded type wherein one layer of volume hologram recording medium is multi-exposed to a plurality of wavelengths.

The image pickup element used comprises electrical receiving elements such as CCDs or photosensitive elements such as silver salt films.

Thus, the present invention provides a viewing or image pickup optical system that is suitable for use with cellar phones, portable information terminals and head-mounted virtual image viewing devices, can be used with high efficiency at a plurality of wavelengths, and is easy to assemble, resistant to impacts such as vibrations, light in weight and compact in size with well corrected aberrations, and devices using the same.

What we claim is:

1. An optical system which is disposed between an image plane and an optical pupil and having generally positive power, wherein:
    said optical system comprises a first prism having a refractive index of greater than 1, a second prism having a refracting index of greater than 1, and a volume hologram element disposed between said first prism and said second prism and cemented thereto, wherein:
        said volume hologram element comprises a first volume hologram optimized in such a way as to effect Bragg diffraction at least at a first wavelength and a second volume hologram optimized in such a way as to effect Bragg diffraction at a second wavelength different from said first wavelength, and said volume hologram element is designed in such a way that diffraction efficiency thereof reaches a maximum at a first angle of incidence and a first angle of reflection and diffraction which vary with the position of said volume hologram element at at least said first wavelength and at a second angle of incidence and a second angle of reflection and diffraction which vary with the position of said volume hologram element at at least said second wavelength,
    said first prism is located on said optical pupil side and said second prism is located on said image plane side,
    said second prism has at least one reflecting surface formed at a surface thereof different from a surface thereof having said volume hologram element,
    a light beam, which propagates from said optical pupil to said image plane in a forward or backward direction and includes at least a ray component of said first wavelength and at least a ray component of said second wavelength, passes through said volume hologram element in order from said first prism side to said second prism side, whereupon said light beam is reflected at said reflecting surface in said second prism and reflected and diffracted by said volume hologram element in said second prism, and
    said first volume hologram and said second volume hologram are identical with each other in terms of interference fringe shape and spacing on the surfaces thereof but are different from each other in terms of interference fringe spacing and tilt in hologram media.

2. The optical system according to claim 1, wherein said first prism and said second prism are constructed of the same medium.

3. The optical system according to claim 1, wherein a surface of said first prism to which said volume hologram element is cemented and a surface of said second prism to which said volume hologram element is cemented are configured in much the same shape.

4. The optical system according to claim 3, wherein a surface of said first prism to which said volume hologram element is cemented and a surface of said second prism to which said volume hologram element is cemented are each configured in a planar or cylindrical shape.

5. The optical system according to claim 1, wherein, in order of a ray propagating from said optical pupil to said image plane, said first prism comprises, at least, a first entrance surface for entering the ray from said optical pupil into said first prism and a first exit surface through which the ray leaves said first prism with a first prism medium filled between them,
    said second prism comprises, at least, a first entrance surface for entering a ray emerging from said first prism into said second prism, a reflecting surface for reflecting the ray within said second prism and a second exit surface through which the ray leaves said second prism, with a second prism medium filled between them, and
    said reflecting surface in said second prism is configured in such a concave curved shape as to give positive power to the ray on reflection.

6. The optical system according to claim 5, wherein said first entrance surface of said first prism is configured in such a curved shape as to give power to the ray on transmission, and
    said second exit surface of said second prism is configured in such a curved shape as to give power to the ray on transmission.

7. The optical system according to clam 1, wherein a ghost light removal member for preventing ghost light from striking on the eyeball of an observer is provided on an optically inactive surface of said first and second prisms other than optically active surfaces for transmitting and reflecting light rays.

8. The optical system according to claim 1, wherein a first entrance surface of said first prism is configured in a rotationally asymmetric curved shape having an action on correction of rotationally asymmetric aberrations.

9. The optical system according to claim 8, wherein said rotationally asymmetric curved shape is constructed of a free-form surface having only one symmetric plane that is in coincidence with a turn-back plane (Y-Z plane) of an optical axis.

10. The optical system according to claim 1,
wherein a second exit surface of said second prism is configured in a rotationally asymmetric curved shape.

11. The optical system according to claim 10,
wherein said rotationally asymmetric curved shape is constructed of a free-form surface having only one symmetric plane that is in coincidence with a turn-back plane (Y-Z plane) of an optical axis.

12. The optical system according to claim 1,
wherein chromatic aberrations of magnification of both a rotationally symmetric component and a rotationally asymmetric component are corrected by allowing said volume hologram element to reflect and diffract the light ray.

13. The optical system according to claim 1,
wherein said reflecting surface of said second prism satisfies at least one of the following conditions (1) and (2):

$$-0.20 < PX4/PX < 0.50 \quad (1)$$

$$-0.20 < PY4/PY < 0.30 \quad (2)$$

with the proviso that the decentration direction of the optical system is a Y-axis direction, a direction perpendicular to a turn-back plane of an optical axis is an X-axis direction, PX is the power of the optical system in the X-axis direction, PY is the power of the optical system in the Y-axis direction, PX4 is the power of the reflecting surface of the second prism in the X-axis direction, and PY4 is the power of the reflecting surface of the second prism in the Y-axis direction.

14. The optical system according to claim 1, wherein a two-dimensional image display element is disposed on said image plane to construct a viewing optical system enabling an image on said two-dimensional image display element to be viewed on an enlarged scale from said optical pupil side.

15. A head-mounted image display device comprising a body portion in which an optical system as recited in claim 14 is built as a viewing optical system, a support member for supporting said body portion over the head of an observer 30 that said optical pupil of said viewing optical system is held at an eyeball position of the observer, and a speaker member for giving sounds to the ear of said observer.

16. The head-mounted image display device according to claim 15, wherein said body portion comprising a viewing optical system for the right eye and a viewing optical system for the left eye, and said speaker member comprises speaker means for the right ear and speaker means for the left ear.

17. The head-mounted image display device according to claim 15, wherein said speaker member is constructed of an earphone.

18. The optical system according to claim 1, which is an image pickup optical system comprising an image pickup element disposed on said image plane so that object light is entered from said optical pupil side to pick up an object image.

19. An image pickup device comprising said image pickup optical system as recited in claim 18 and means for observing an object image received at said image pickup element.

* * * * *

UNITED STATES PATENT AND TRADEMARK OFFICE
CERTIFICATE OF CORRECTION

PATENT NO. : 6,704,128 B2
DATED : March 9, 2004
INVENTOR(S) : Tetsuhide Takeyama et al.

It is certified that error appears in the above-identified patent and that said Letters Patent is hereby corrected as shown below:

Column 17,
Line 38, change equation "(e)" from "$Z=\Sigma_{n\Sigma m}C_{nm}X^{n}Y^{n-m}$" to -- $Z=\Sigma_{n}\Sigma_{m}C_{nm}X^{n}Y^{n-m}$ --.

Signed and Sealed this

Twelfth Day of October, 2004

JON W. DUDAS
*Director of the United States Patent and Trademark Office*